US012409471B2

(12) United States Patent
Li

(10) Patent No.: US 12,409,471 B2
(45) Date of Patent: Sep. 9, 2025

(54) GLUE GUN

(71) Applicant: HANGZHOU GREAT STAR INDUSTRIAL CO., LTD., Hangzhou (CN)

(72) Inventor: Yueming Li, Hangzhou (CN)

(73) Assignee: HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 498 days.

(21) Appl. No.: 17/887,030

(22) Filed: Aug. 12, 2022

(65) Prior Publication Data

US 2023/0028417 A1 Jan. 26, 2023

Related U.S. Application Data

(63) Continuation-in-part of application No. 17/843,646, filed on Jun. 17, 2022, which is a continuation-in-part of application No. 16/627,142, filed as application No. PCT/CN2019/070422 on Jan. 4, 2019, now Pat. No. 11,364,519.

(51) Int. Cl.
*B05C 17/01* (2006.01)

(52) U.S. Cl.
CPC ...... *B05C 17/0123* (2013.01); *B05C 17/0136* (2013.01)

(58) Field of Classification Search
CPC .................................................. B05C 17/0126
USPC .......................................................... 222/391
See application file for complete search history.

(56) References Cited

U.S. PATENT DOCUMENTS 4,339,058 A * 7/1982 Wendt ..................... B05C 17/01 222/326
5,197,635 A * 3/1993 Chang ............... B05C 17/00553 222/391
6,056,156 A 5/2000 Peng
6,640,998 B1 * 11/2003 Kern ................... B05C 17/0126 222/391
11,364,519 B2 6/2022 Li
(Continued)

FOREIGN PATENT DOCUMENTS

CN 2824692 Y 10/2006
CN 101099961 A 1/2008
(Continued)

OTHER PUBLICATIONS

CNIPA; Chinese Office Action from Chinese Application No. 202320373452.9; Jan. 19, 2024; In Chinese with English Machine Translation (4 pages).

*Primary Examiner* — Jeremy Carroll
(74) *Attorney, Agent, or Firm* — Fitch, Even, Tabin & Flannery LLP

(57) ABSTRACT

A glue gun, including: a main body with one end formed as an accommodation part for accommodating a glue cylinder; a fixed handle connected to another end of the main body; a movable handle pivotally connected to the fixed handle; a push rod with one end located in the accommodation part; a brake provided on the push rod; and a movable member provided on the main body, where the movable member is configured to lock the brake, so as to continuously apply a force on the glue cylinder, and release the brake to release the force applied by the brake on the glue cylinder.

20 Claims, 30 Drawing Sheets

(56) References Cited

U.S. PATENT DOCUMENTS

| | | | | |
|---|---|---|---|---|
| 2002/0092871 | A1* | 7/2002 | Rickard ............. | A61B 17/8822 222/391 |
| 2009/0134187 | A1* | 5/2009 | Hefele ................ | B05C 17/0126 222/391 |
| 2012/0145749 | A1* | 6/2012 | Hung .................. | B05C 17/0123 222/391 |
| 2017/0348724 | A1* | 12/2017 | Hung .................. | B05C 17/0126 |
| 2019/0299244 | A1* | 10/2019 | Xia ..................... | B05C 17/0123 |
| 2021/0331200 | A1 | 10/2021 | Li | |

FOREIGN PATENT DOCUMENTS

| | | | |
|---|---|---|---|
| CN | 101444772 | A | 6/2009 |
| CN | 202062389 | U | 12/2011 |
| CN | 107116010 | A | 9/2017 |
| CN | 207138230 | U | 3/2018 |
| CN | 108580210 | A | 9/2018 |
| CN | 210079978 | U | 2/2020 |
| CN | 217963341 | U | 12/2022 |
| EP | 0736333 | A2 | 10/1996 |
| KR | 20100030529 | A | 3/2010 |

* cited by examiner

GLUE GUN

FIELD OF THE INVENTION

The present invention relates to the field of hardware, and in particular to a glue gun, which belongs to the technical field of tools for use in production, processing, manufacturing and construction industries.

DESCRIPTION OF THE PRIOR ART

During the use of a glue gun, glue is pushed by a gun-type handle lever, which continuously reciprocates to squeeze the glue such that same is discharged. One end of the glue gun is provided with a trigger mechanism suitable for a user to hold and press. As the user manually presses the trigger mechanism, the glue placed in the glue gun can be driven by a mechanical structure of the glue gun such that the glue is discharged at a glue outlet of a glue cylinder. One glue gun can be adapted to various types of glue with different characteristics, and different glue has different fluidity. A common glue gun only has a fixed squeezing mechanism, so it is very difficult to achieve uniform glue discharge in the process of glue application. In specific application scenarios of the glue gun, different glue discharge speeds are required owing to different ranges of glue application. However, the common glue gun only has the fixed squeezing mechanism, so the glue discharge speed of the glue cylinder can be controlled only by means of the pressing speed of the user's hand. In fact, it is extremely difficult to control the pressing speed of the user's hand while applying a force, especially when applying a large force to the handle. In the process of starting to use the glue gun, usually, since same is left unused for a long time, some of the glue is solidified, and the static viscosity of the glue and other problems exist, a relatively large force is usually required to drive the glue gun in the beginning of using same, and after the glue discharge is stabilized, the driving force required by the glue gun will be significantly reduced. The fixed squeezing mechanism of the common glue gun cannot solve these problems. In addition, in order to discharge the glue, same is usually squeezed hard in the beginning of using the glue gun, but the squeezing speed is difficult to control, so there is the problem of glue waste caused by excessive extrusion after the glue is squeezed out.

Therefore, a person skilled in the art is dedicated to developing a glue gun, in which the gear can be adjusted to enable switching between a fast feed and a powerful feed, thereby enabling the user to make adjustment according to actual requirements.

SUMMARY OF THE INVENTION

In view of the above defects in the prior art, the technical problem to be solved by the present invention is how to make gears of the glue gun adjustable.

In order to achieve the above-mentioned purpose, the present invention provides a glue gun, where the glue gun includes a movable handle and a fixed handle, and the movable handle is connected to fixed handle via a pivot pin shaft; the movable handle is further provided with an actuating member, and the actuating member is provided with an actuating part cooperating with a push member; and a spacing between the pivot pin shaft and the actuating part is sized to be switchable between two or more gears, such that the magnitude of the force applied by the actuating member on the push member is changed.

Further, the movable handle is provided with a sliding groove, which is provided with two or more gears; and the pivot pin shaft is arranged to be slidable in the sliding groove so as to enable switching between the gears.

Further, the fixed handle is provided with a sliding groove, which is provided with two or more gears; and the pivot pin shaft is arranged to be slidable in the sliding groove so as to enable switching between the gears.

Further, an elastic component is further provided between the movable handle and the fixed handle; and the elastic component is arranged to produce a pre-tightening force on the movable handle so as to keep the pivot pin shaft in one of the gears.

Further, the pivot pin shaft is a stepped pin shaft having a pressing end, the pressing end is sheathed with an elastic component, the stepped pin shaft has a first shaft diameter portion and a second shaft diameter portion, the shaft diameter of the first shaft diameter portion is greater than the width of the sliding groove, the shaft diameter of the second shaft diameter portion is smaller than the width of the sliding groove, and the stepped pin shaft is arranged such that: under the biasing action of the elastic component, the first shaft diameter portion is in the gear; when the pressing end is pressed, the stepped pin shaft moves axially such that the second shaft diameter portion goes into the gear; and when the pressing end is released, the stepped pin shaft moves axially in the opposite direction under the action of a restoring force of the elastic component such that the first shaft diameter portion goes into the gear again.

Further, the sliding groove is an arc-shaped groove or a linear groove.

Further, the movable handle is provided with a sliding groove, which is provided with two or more gears; and the actuating part is arranged to be slidable in the sliding groove so as to enable switching between the gears.

Further, the actuating member further includes a pivot, and the actuating part of the actuating member is arranged to be slidable in the sliding groove around the pivot.

Further, a brake is sheathed on a push rod, one end of the brake cooperates with a limiting groove of a main body, and the one end of the brake moves between a first limiting end and a second limiting end of the limiting groove, so that the push rod has an idle stroke, with a distance from the first limiting end to the second limiting end, in the pushing process.

Further, the idle stroke is 3 to 5 mm.

In order to achieve the above purpose, the present invention further provides a glue gun, including:

- a first handle and a second handle, where the first handle is connected to the second handle via a pivot pin shaft; one of the first handle and the second handle is arranged as a fixed handle, and the other is arranged as a movable handle rotating relative to the fixed handle;
- the movable handle is provided with an actuating member, and the actuating member is configured to push a push member of the glue gun; and
- at least one of the actuating member and the pivot pin shaft is arranged to be adjustable in position so as to switch between at least two gears, so that the ratio of a spacing between the pivot pin shaft and a force application point on the movable handle to a spacing between the pivot pin shaft and a force bearing point on the actuating member is changed, thus enabling a change in the force applied on the push member as well as a change in the rate of movement of a push rod.

Further, a spacing between the axis of the actuating member and the axis of the pivot pin shaft is sized to be adjustable, such that the pivot pin shaft or the actuating member can switch between the at least two gears.

Further, one of the first handle and the second handle is provided with a sliding groove, which is provided with the at least two gears; and the pivot pin shaft is arranged to be slidable in the sliding groove so as to enable switching between the gears.

Further, an elastic component is further provided between the first handle and the second handle; and the elastic component is arranged to produce a pre-tightening force on one of the first handle and the second handle which is arranged as the movable handle so as to keep the pivot pin shaft in one of the gears.

Further, the pivot pin shaft is a stepped pin shaft, the stepped pin shaft has a first shaft diameter portion and a second shaft diameter portion, the widths of the sliding groove at the gears are greater than the width of a communication portion of the sliding groove which communicates the gears; the shaft diameter of the first shaft diameter portion is greater than the width of the communication portion, and the shaft diameter of the second shaft diameter portion is smaller than the width of the communication portion; and the stepped pin shaft is configured such that: the stepped pin shaft moves axially under the action of an external force, and when the first shaft diameter portion is in any of the gears, the stepped pin shaft is kept in the gear, and when the second shaft diameter portion is in the gear, the stepped pin shaft can slide along the sliding groove.

Further, the stepped pin shaft has a pressing end, the pressing end is sheathed with an elastic component, and the stepped pin shaft is configured such that: under the biasing action of the elastic component, the first shaft diameter portion is in the gear; when the pressing end is pressed, the stepped pin shaft moves axially such that the second shaft diameter portion goes into the gear; and when the pressing end is released, the stepped pin shaft moves axially in the opposite direction under the action of a restoring force of the elastic component such that the first shaft diameter portion goes into the gear again.

Further, one end of the stepped pin shaft is connected to a pressing portion, the pressing portion is provided with at least one positioning pin, and the axial direction of the positioning pin is parallel to the axial direction of the stepped pin shaft; the sliding groove is provided on the first handle, the second handle is provided with at least one positioning groove, and the positioning pin passes through the positioning groove and is configured to slide in the positioning groove; the positioning pin is sheathed with an elastic component, where the stepped pin shaft and the positioning pin are configured to move along with the pressing portion, and under the biasing action of the elastic component, the first shaft diameter portion is in the gear; when the pressing portion is pressed, the stepped pin shaft and the positioning pin move axially such that the second shaft diameter portion goes into the gear; and when the pressing portion is released, the positioning pin and the stepped pin shaft move axially in the opposite direction under the action of a restoring force of the elastic component such that the first shaft diameter portion goes into the gear again.

Further, the glue gun further includes a blocking piece arranged opposite the pressing portion, and the other ends of the stepped pin shaft and the positioning pin are connected to the blocking piece by fasteners.

Further, the pressing portion is provided with a first positioning pin and a second positioning pin, and the second handle is provided with a first positioning groove corresponding to the first positioning pin and a second positioning groove corresponding to the second positioning pin.

Further, the first positioning pin, the second positioning pin and the stepped pin shaft are distributed in a triangle shape.

Further, the first positioning pin and the second positioning pin are on a same straight line.

Further, a boss is provided on an outer surface of the pressing portion.

Further, the sliding groove is an arc-shaped groove or a linear groove.

Further, the first handle is provided with a sliding groove, which is provided with the at least two gears; and the actuating part is arranged to be slidable in the sliding groove so as to enable switching between the gears.

Further, the actuating member further includes a pivot, and the actuating part on the actuating member is arranged to be slidable in the sliding groove around the pivot.

Further, the glue gun further includes:

- a brake sheathed on a push rod of the glue gun, where a compression spring is provided between the brake and a main body of the glue gun, and the brake is configured to retain the push rod under the push of the compression spring, so that the push rod can only move in the direction of glue flowing out.

Further, the main body is provided with a limiting groove, and one end of the brake is positioned in the limiting groove; and the limiting groove has a first limiting end and a second limiting end, and the brake is configured to move between the first limiting end and the second limiting end, so that the push rod has an idle stroke, with a distance being that from the first limiting end to the second limiting end, in a pushing process.

Further, the idle stroke is 3 to 5 mm.

In order to achieve the above purpose, the present application further provides a glue gun, including:

- a trigger device including a movable handle and a fixed handle which are connected via a pivot pin shaft;
- a main body with one end formed as an accommodation part for accommodating glue and the other end connected to the fixed handle;
- a push rod with one end provided with a push body positioned in the accommodation part and the other end sheathed with a push member, where the push body is arranged to reciprocate along with the push rod;
- an actuating member provided on the movable handle and configured to push the push member; and
- a brake sheathed on the push rod, where a compression spring is provided between the brake and the main body, and the brake is configured to retain the push rod under the push of the compression spring, so that the push rod can only move in the direction of the glue flowing out,
- where a spacing between the actuating member and the pivot pin shaft is sized to be adjustable to make the glue gun switch between at least two gears, so that the ratio of a spacing between the pivot pin shaft and a force application point on the movable handle to a spacing between the pivot pin shaft and a force bearing point on the actuating member is changed, thus enabling a change in the force applied on the push member as well as a change in the rate of movement of the push rod.

Further, the movable handle has a sliding groove, and the sliding groove has a first gear and a second gear; the actuating member is configured to slide in the sliding groove so as to switch between the first gear and the second gear;

or the pivot pin shaft is configured to slide in the sliding groove so as to switch between the first gear and the second gear.

Compared with the prior art, the beneficial effects of the present invention are as follows: 1) when the pivot pin shaft is close to the actuating part, the force of the actuating part acting on the push member is increased, which is suitable for glue with a poor fluidity; and when the pivot pin shaft is far away from the actuating part, the force of the actuating part acting on the push member is reduced, which is suitable for glue with a good fluidity; 2) the arrangement of the elastic component between the movable handle and the fixed handle can prevent the pivot pin shaft from automatically jump to other gears when a gripping force is applied on the movable handle, playing the role of fixing the gear; 3) under the biasing action of the elastic component, the stepped pin shaft can be pressed to easily realize multi-gear shifting; 4) the gear can be adjusted to enable switching between a fast feed and a powerful feed, thereby enabling the user to make adjustment according to actual requirements; and 5) the idle stroke is set such that the internal stress of the glue in a glue cylinder is released, thereby preventing the glue from flowing out of a glue outlet.

The present invention further provides a glue gun, which can switch between the following two states: in a first state, after a handle is released, glue in a glue cylinder is kept dripping continuously; and in a second state, after the handle is released, the glue does not drip any more.

In order to achieve this purpose, the present invention provides a glue gun, including: a main body with one end formed as an accommodation part for accommodating a glue cylinder;

- a fixed handle connected to another end of the main body;
- a movable handle pivotally connected to the fixed handle;
- a push rod with one end located in the accommodation part;
- a brake provided on the push rod; and
- a movable member provided on the main body, where the movable member is configured to lock the brake, so as to continuously apply a force on glue in the glue cylinder to keep an internal stress of the glue, and release the brake to release the force applied on the glue in the glue cylinder, thereby releasing the internal stress of the glue.

Further, the main body is provided with a limiting groove, the limiting groove has a first limiting end and a second limiting end, one end of the brake is located in the limiting groove, and the brake is configured to move between the first limiting end and the second limiting end.

Further, the movable member is configured to be movable; and the movable member has a first position and a second position, where in the first position, the movable member locks the brake, so after the movable handle is released, the internal stress of the glue is still kept, so that the glue in the glue cylinder is dripping continuously; and in the second position, the movable member unlocks the brake, so after the movable handle is released, the internal stress of the glue is released, so that the glue does not drip any more.

Further, the movable member is pivotally connected to the main body, and the movable member has an end portion facing the brake; when the movable member is in the first position, the end portion locks the brake; and when the movable member is in the second position, the end portion releases the brake.

Further, a top of the main body is provided with a convex piece, the limiting groove is formed in the convex piece, and the movable member is pivotally connected to the convex piece.

Further, the convex piece is provided with a pin shaft, a first through hole is provided in the movable member, and the pin shaft is sheathed in the first through hole.

Further, the first through hole is located in the middle of the movable member.

Further, a second through hole is provided in the movable member, a positioning boss is provided on the convex piece, and when the movable member is in the first position, a part of the positioning boss is embedded into the second through hole.

Further, the positioning boss is a trapezoid boss, side faces of the trapezoid boss are inclined, and a size of a top of the trapezoid boss is smaller than a size of a bottom of the trapezoid boss.

Further, the movable member is provided with a corner portion, the corner portion faces the main body, and when the movable member is in the second position, the corner portion is in contact with the main body to block the movable member.

Further, the movable member is provided with an arc-shaped portion, the arc-shaped portion and the corner portion are located on a same side of the movable member, and the arc-shaped portion is always in contact with the main body.

Further, the movable member includes a first part and a second part that are the same and are symmetrically arranged, there is a gap between the first part and the second part, and the convex piece is inserted into the gap; and the first part and the second part are connected together by a connection portion.

Further, the connection portion is provided with a proximal end and a distal end, and the movable member is configured such that when the proximal end is pressed, the movable member is rotated to the first position, and when the distal end is pressed, the movable member is rotated to the second position.

Further, a rotating shaft of the movable member is provided at an end away from the brake.

Further, the movable member is configured such that when an end of the movable member opposite to the rotating shaft is pressed, the movable member is moved to the first position.

Further, the movable member is provided on one side of the convex piece, and a rotating shaft of the movable member is provided at an end of the movable member away from the brake.

Further, the rotating shaft of the movable member includes a screw passing through the convex piece and a nut provided at one end of the screw, and the movable member is provided with a sleeve with which the nut is sheathed.

Further, a blind hole is provided in the movable member, the blind hole and the sleeve are provided on a same side of the movable member, the convex piece is provided with a protrusion, and an elastic element connects the protrusion and the blind hole respectively.

Further, a groove is provided in the movable member, a blocking portion is protruded on the convex piece, and the blocking portion falls into the groove when the movable member is in the second position.

Further, the blocking portion is obliquely provided on the convex piece.

The concept, specific structures, and technical effects of the present invention will be further illustrated below in conjunction with accompanying drawings, such that the purpose, features, and effects of the present invention can be fully understood.

DETAILED DESCRIPTION OF THE PREFERRED EMBODIMENTS

Figure 1:
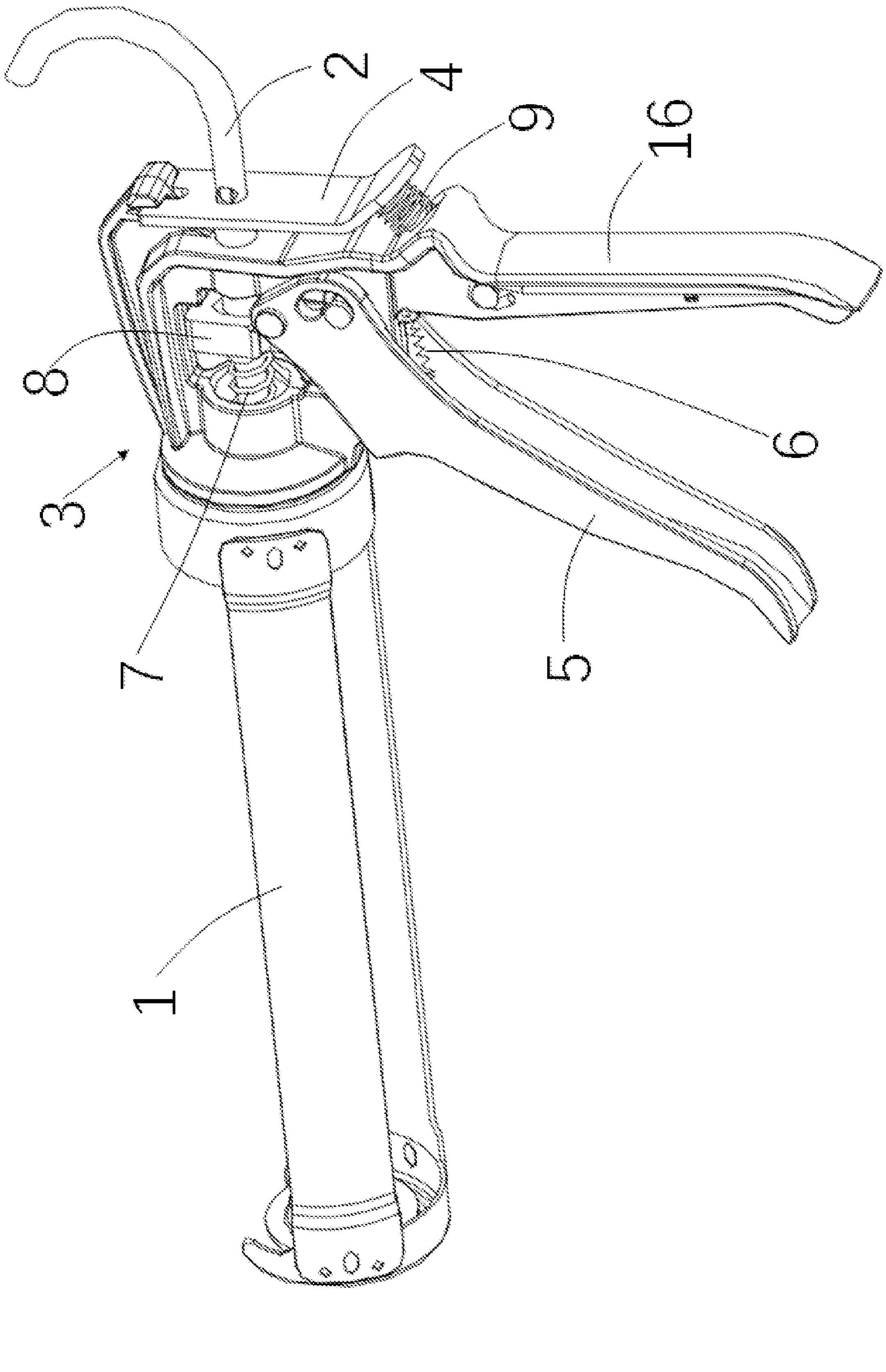
FIG. 1 is a schematic diagram showing the structure of a glue gun according to Embodiment 1 of the present invention.

A plurality of preferred embodiments of the present invention will be described hereafter with reference to the accompanying drawings of the description, so that the technical contents thereof will be more clearly and easily understood. The present invention can be embodied by many different forms of examples, and the protection scope of the present invention is not limited to the examples mentioned in the text.

In the drawings, components with the same structure are denoted by the same reference numeral, and components with similar structures or functions are denoted by similar reference numerals. The size and thickness of each constituent part as shown in the drawings are arbitrarily shown, and the present invention does not limit the size and thickness of each constituent part. In order to make the illustration clearer, the thickness of parts is appropriately exaggerated somewhere in the drawings.

Embodiment 1

Figure 2:
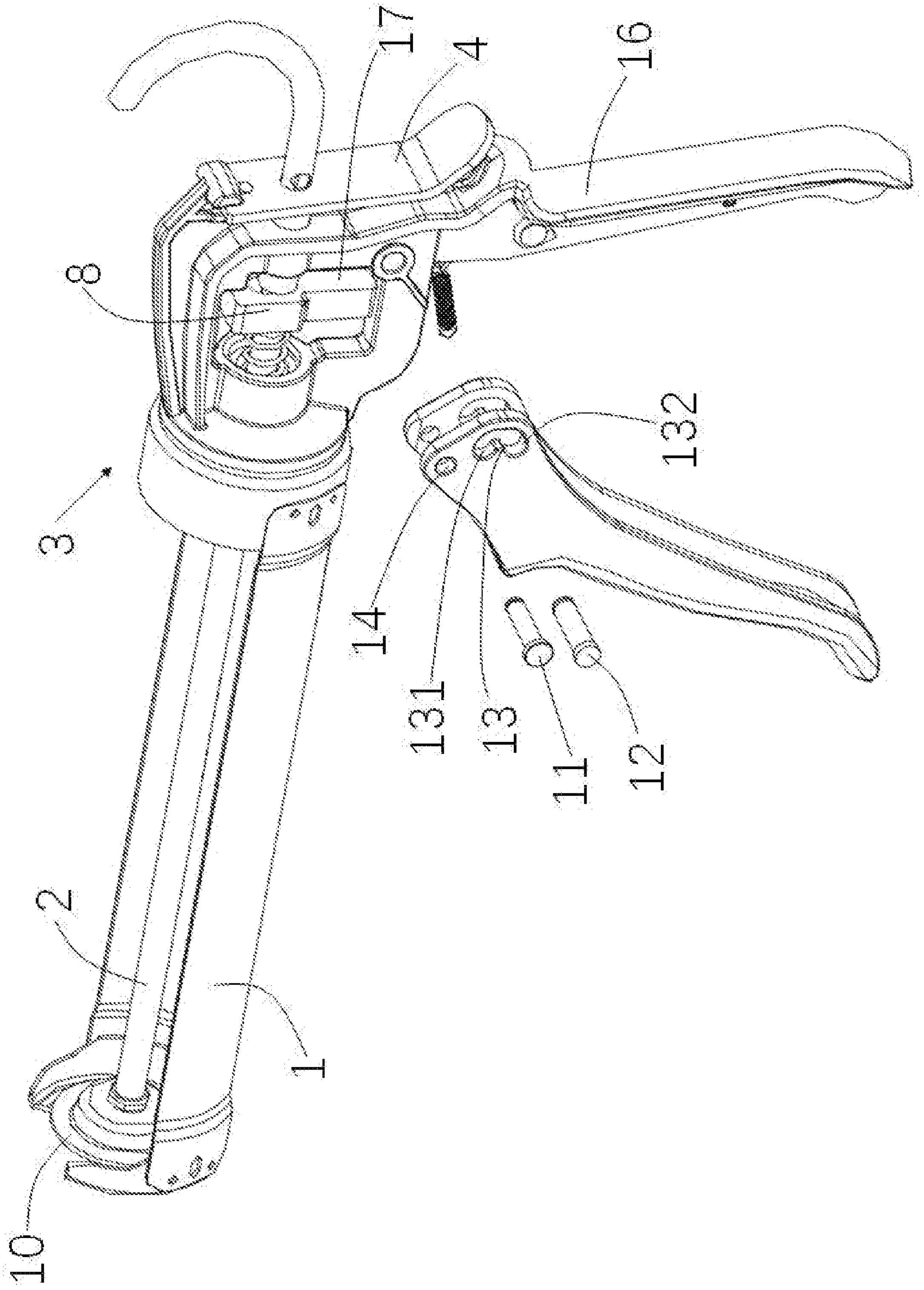
FIG. 2 is a schematic exploded diagram showing a partial structure of the glue gun in FIG. 1.

FIGS. 1 to 4 show a preferred embodiment of the present invention, and as shown in FIGS. 1 and 2, a glue gun of this embodiment includes a push device, a main body 3 and a trigger device. An accommodation part 1 is formed at one end of the main body 3, and the accommodation part 1 is provided in the shape of a cylinder so as to accommodate a glue cylinder. The other end of the main body 3 and the trigger device are hinged via a fastener or are integrally formed to form a gun-shaped fixed handle 16.

The push device includes a push member 8, a push rod 2 and a push body 10. A first end of the push rod 2 is placed in the accommodation part 1. One end of the accommodation part 1 is connected to the main body 3, and the other end is provided with an outlet for a nozzle of the glue cylinder to pass through. The push body 10 is fixed to an end portion of the first end of the push rod 2 and can reciprocate along with the push rod 2. A second end of the push rod 2 is sheathed with the push member 8, and a restoring spring 7 is also provided between the push member 8 and the main body 3. The trigger device pushes the push member 8, so that the push rod 2 and the push body 10 moves together towards the outlet of the accommodation part 1, and the restoring spring 7 restores the push member 8 in position. The push rod 2 is also provided with a brake 4, and a compression spring 9 is provided between the brake 4 and the main body 3. The brake 4 retains the push rod 2 under the push of the compression spring 9, so that the push rod 2 can only move towards the accommodation part 1. When the glue cylinder needs to be installed, the brake 4 is pressed to release the push rod 2, so as to adjust the position of the push rod 2. The brake 4 cooperates with a limiting groove 31 of the main body 3, and one end of the brake 4 moves between a first limiting end 32 and a second limiting end 33 of the limiting groove 31. When the brake 4 is located at the second limiting end 33, the brake 4 retains the push rod 2 under an elastic force of the compression spring 9. In glue feeding, the push member 8 is pushed to move toward the outlet of the accommodation part 1, the push rod 2 and the brake 4 will accordingly move together, and the brake 4 moves from the second limiting end 33 to the first limiting end 32. There is no relative displacement between the push rod 2 and the brake 4, that is, the brake 4 has an idle stroke. When the brake 4 moves to the first limiting end 32, the brake 4 is blocked by the first limiting end 32 and does not move any more. At this time, the brake 4 will not retain the push rod 2, so that the push rod 2 can continue to move towards the accommodation part 1, and in this case, a relative displacement occurs between the push rod 2 and the brake 4. The idle stroke is the distance between the first limiting end 32 and the second limiting end 33, and preferably, the length of the idle stroke is 3 to 5 mm. When the glue feeding is finished, a movable handle 5 is released. Under the action of the restoring spring 7, the push member 8 will move away from the accommodation part 1, driving the push rod 2 to move together. When the push rod 2 moves to a position where it is retained by the brake 4, the brake 4 will also move together with the push rod 2. At this time, the brake 4 will move from the first limiting end 32 to the second limiting end 33 so as to release the force acting on the glue inside the glue cylinder, so that the internal stress of the glue inside the glue cylinder is released, thereby preventing the glue from flowing out of a glue outlet. When the brake 4 moves to the second limiting end 33, the brake 4 locks the push rod 2 under the action of the compression spring 9. At this time, the push member 8 will continue to move away from the push rod 2 until the movable handle 5 is restored in position. Repeat the above actions to continue the glue feeding.

The trigger device includes the movable handle 5 and the fixed handle 16. The movable handle 5 is connected to the fixed handle 16 via a pivot pin shaft 12. The movable handle 5 is further provided with an actuating member 11, and the actuating member 11 passes through a hole 14 in the movable handle 5 and makes contact with the push member 8. The movable handle 5 is provided with a sliding groove 13, and the sliding groove 13 is of an arc-shaped structure and has two gears, that is, a first gear 131 and a second gear 132. The first gear 131 and the second gear 132 may be respectively located at two end portions of the sliding groove 13, and the widths of the sliding groove 13 at the first gear 131 and the second gear 132 are greater than the width of other part of the sliding groove 13. The pivot pin shaft 12 can slide in the sliding groove 13. When the pivot pin shaft 12 slides to a position of the first gear 131 of the sliding groove 13, a tension spring 6 is provided between the movable handle 5 and the fixed handle 16. One end of the tension spring 6 is connected to a tension spring groove 15 of the movable handle 5 and the other end is connected to the fixed handle 16. The tension spring 6 produces a pre-tightening force on the movable handle 5 so as to keep the pivot pin shaft 12 in one of the gears. When a gripping force is applied to the movable handle 5, the pivot pin shaft 11 pushes a pushing surface 17 of the push member 8 to move the push rod 2. When the applied force is removed, the brake 4 locks the push rod 2, and under the action of the restoring spring 7, the push member 8 slides and restores to an initial position relative to the main body 3, so that the next cycle can be carried out.

Figure 3:
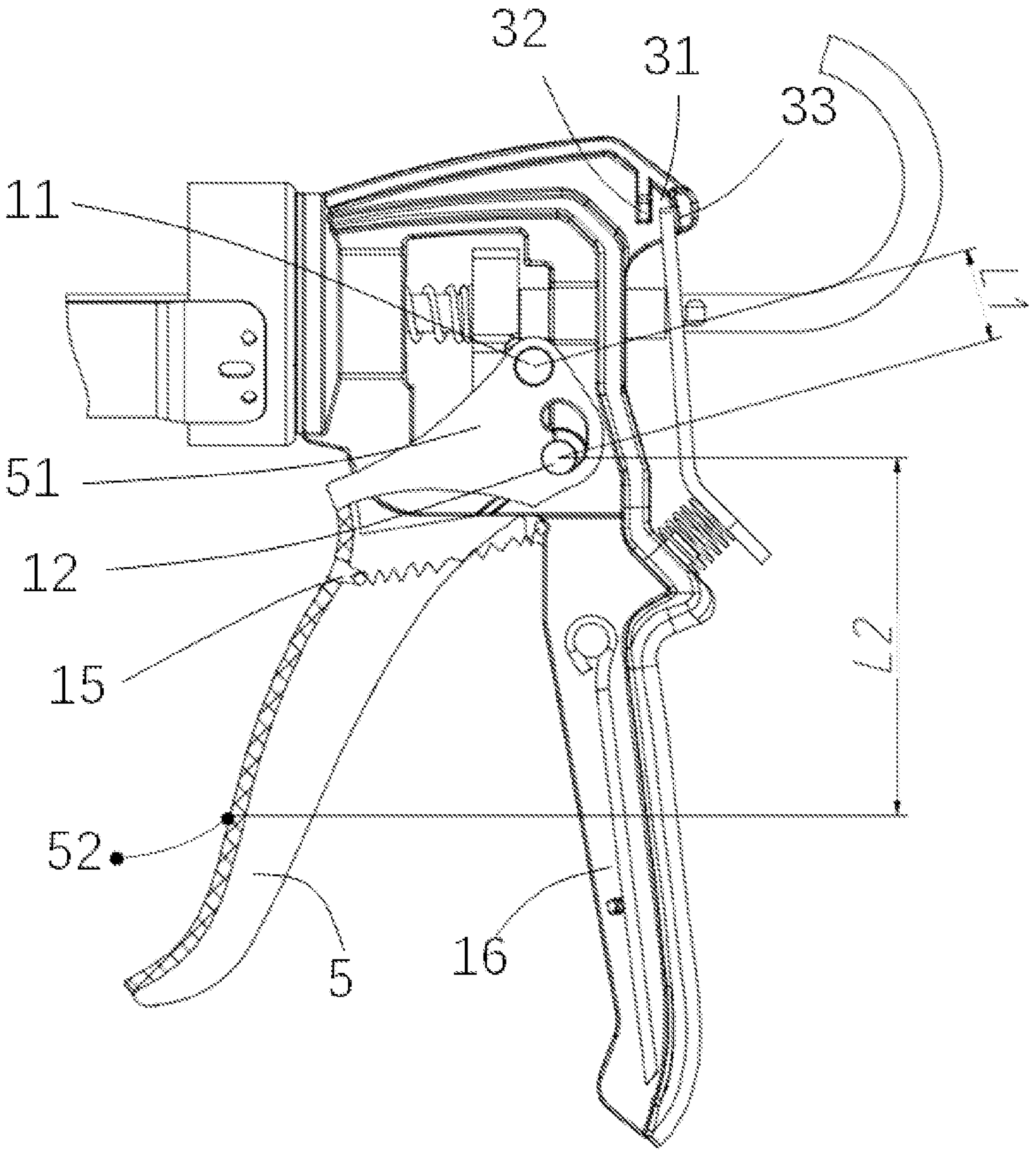
FIG. 3 is a schematic diagram of a first gear in FIG. 1.
Figure 4:
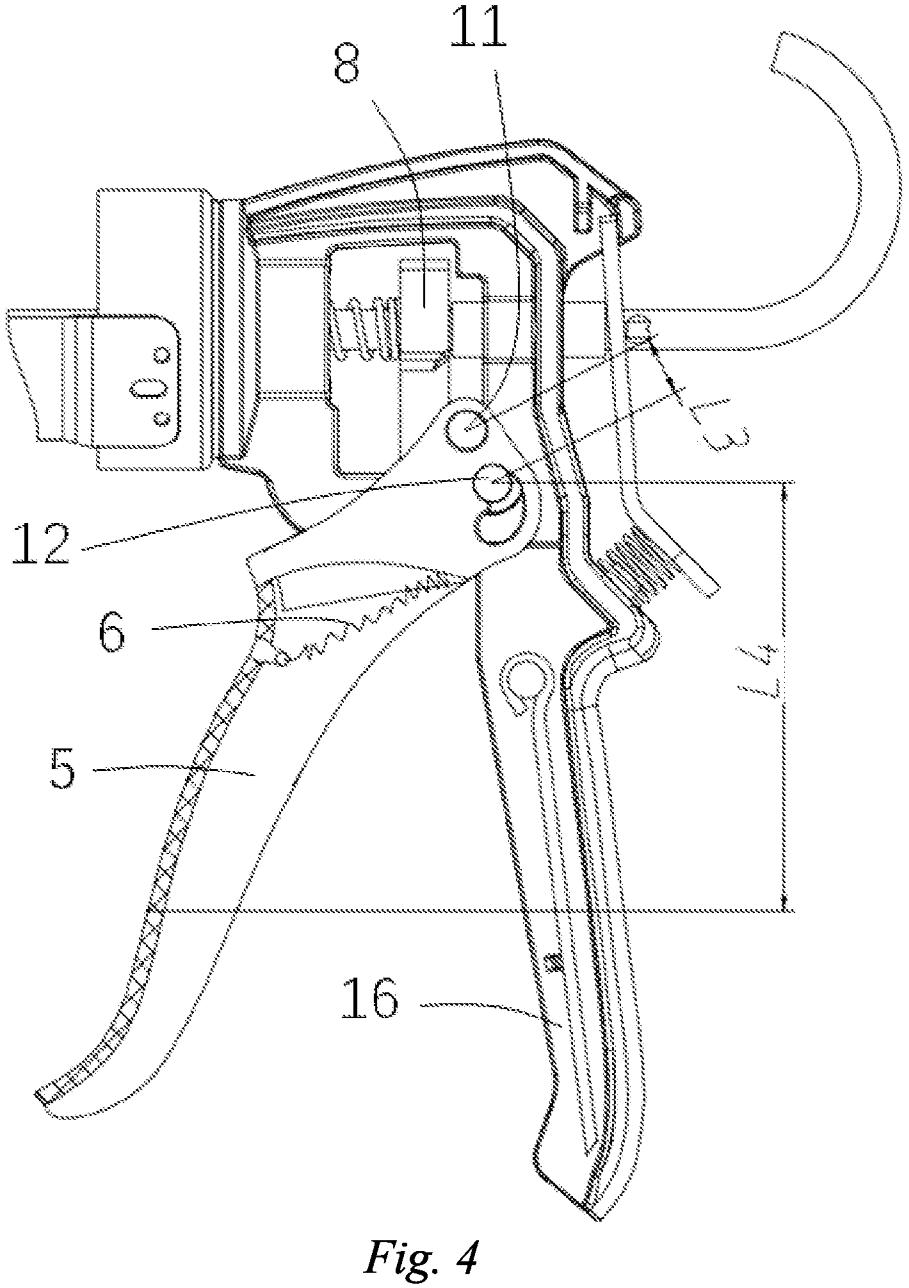
FIG. 4 is a schematic diagram of a second gear in FIG. 1.
Figure 5:
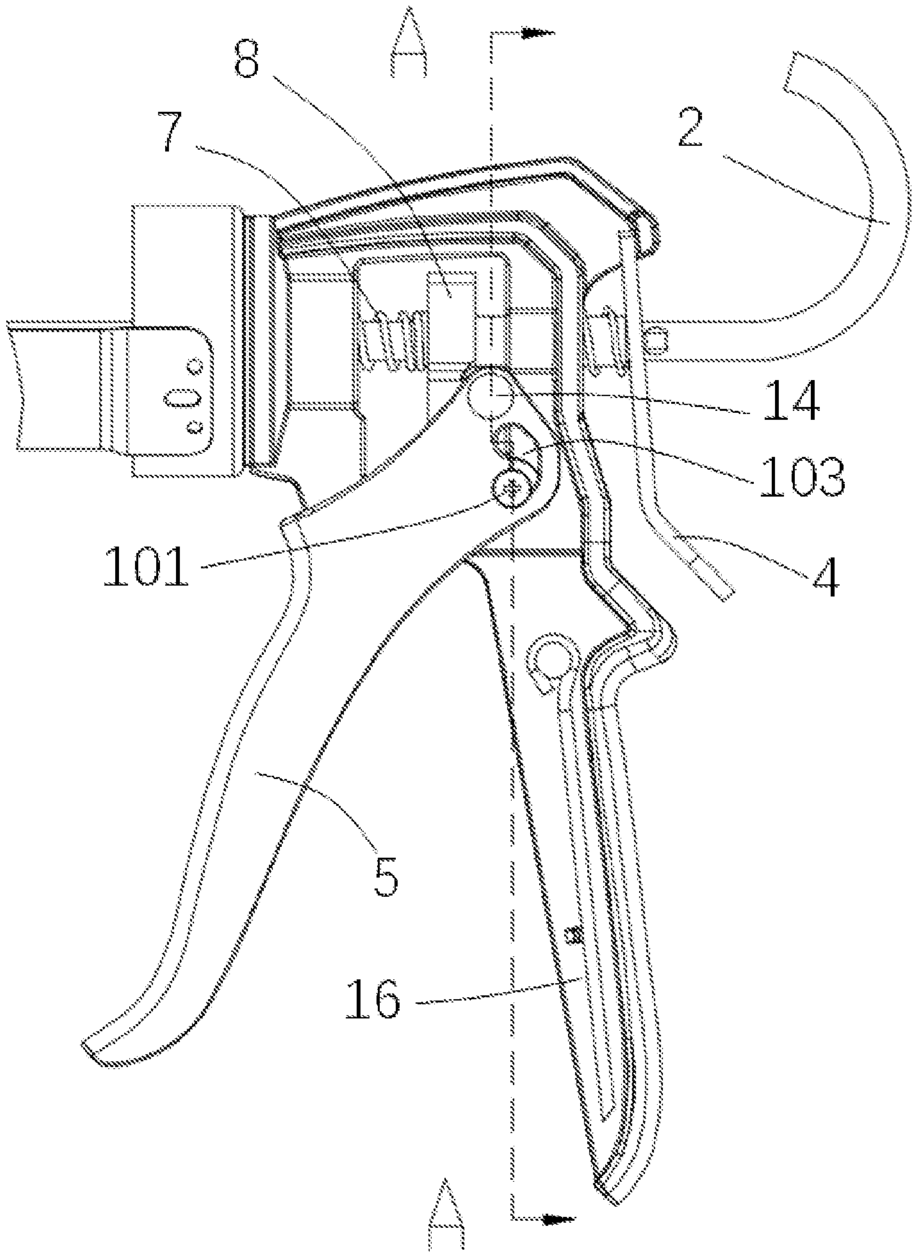
FIG. 5 is a schematic diagram showing the structure of a glue gun according to Embodiment 2 of the present invention.
Figure 6:
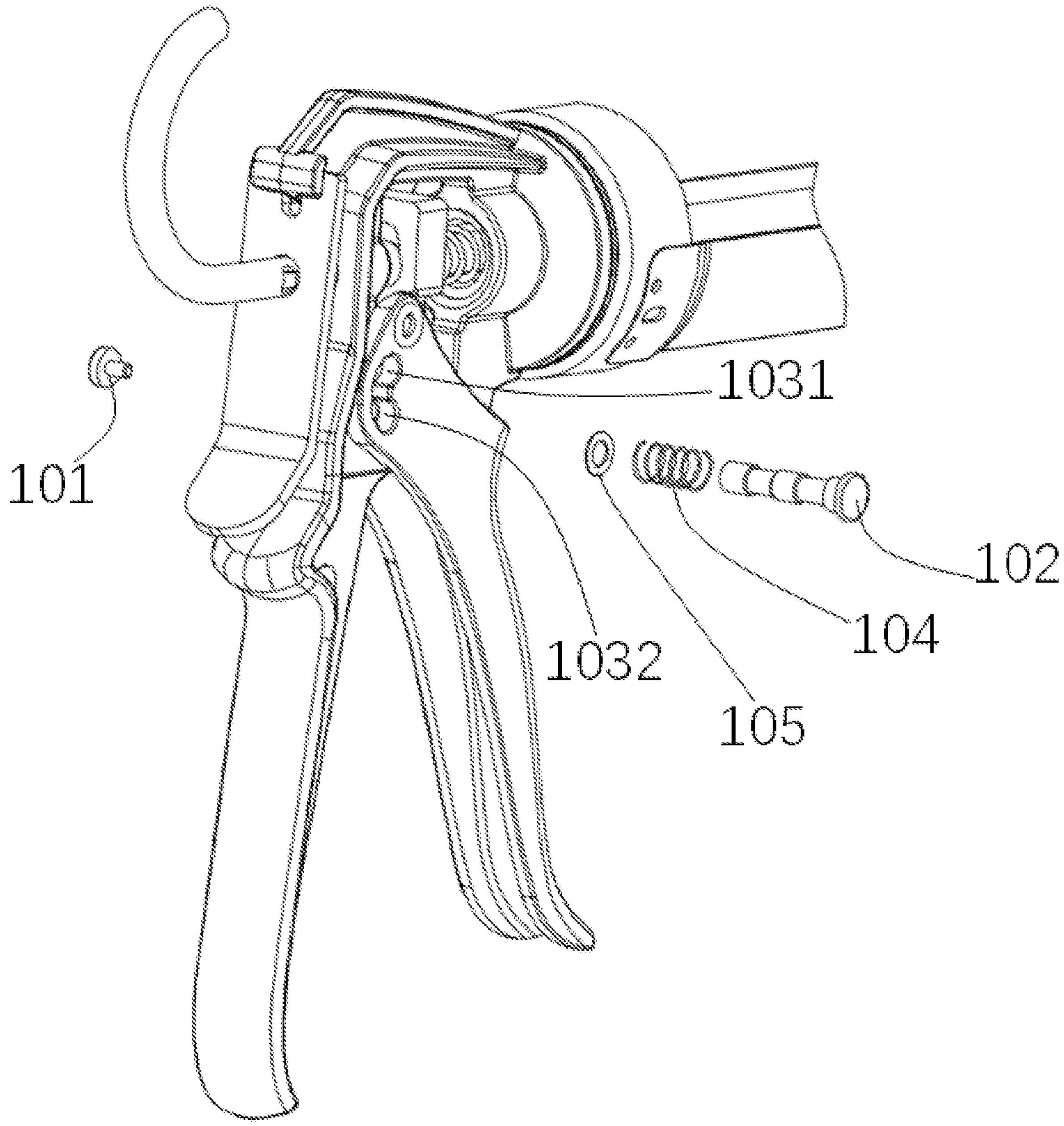
FIG. 6 is a schematic exploded diagram showing a partial structure of the glue gun in FIG. 5.
Figure 7:
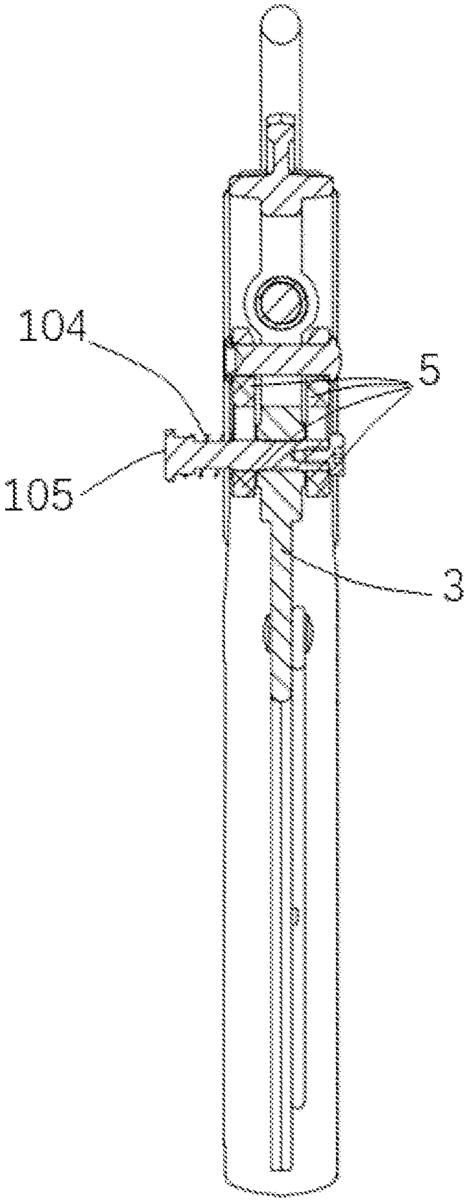
FIG. 7 is an A-A section view of the glue gun in FIG. 5.
Figure 8:
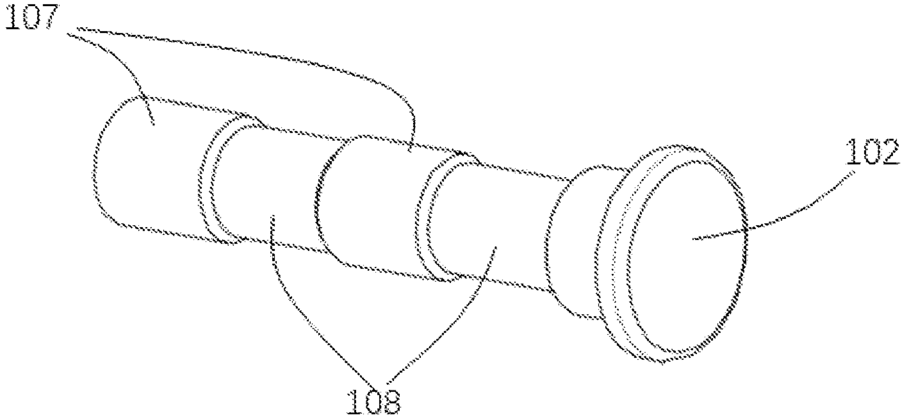
FIG. 8 is a schematic diagram showing the structure of a stepped pin shaft in FIG. 5.

FIGS. 3 and 4 show the variation of the spacing between the pivot pin shaft 12 and the actuating member 11 in different gears. When the pivot pin shaft 12 is in the first gear 131, the spacing between the pivot pin shaft 12 and the actuating member 11 is set as L3. Here, the spacing refers to a distance between the axis of the pivot pin shaft 12 and the axis of the actuating member 11 (In FIGS. 3 and 4, the axis of the pivot pin shaft 12 and the axis of the actuating member 11 are both perpendicular to the plane of the paper and facing outward, that is, on a side face 51 of the movable handle 5, indicating a distance between the center of the circle of the pivot pin shaft 12 and the center of the circle of the actuating member 11). The vertical spacing between the pivot pin shaft 12 and the force applied on the movable handle 5 is set as L4. This vertical spacing refers to a distance between the axis of the pivot pin shaft 12 and a force application point 52 on the movable handle 5 in a vertical direction Y. When the pivot pin shaft 12 is in the second gear 132, the spacing between the pivot pin shaft 12 and the actuating member 11 is set as L1, and the vertical spacing between the pivot pin shaft 12 and the force applied on the movable handle 5 is set as L2. The position of the pivot pin shaft 12 relative to the actuating member 11 changes when it is in different gears, so L1>L3. However, no matter which gear the pivot pin shaft 12 is in, its position is unchanged, so L2=L4. When the gear of the pivot pin shaft 12 is adjusted to the second gear 132, a force F is applied on the movable handle 5, and a force applied by the actuating member 11 on the push member 8 is F1, then F*L2=F1*L1; and when the gear of the pivot pin shaft 12 is adjusted to the first gear 131, a same force F is applied on the movable handle 5, and a force applied by the actuating member 11 on the push member 8 is F2, then F*L4=F2*L3. It can be seen that when the same force F is applied on the movable handle, since L1>L3, there is F1<F2, that is, when in the first gear 131, the pushing force generated by applying the same force on the movable handle 5 is greater than that when in the second gear 132. In the second gear 132, when the movable handle 5 moves, it moves with the pivot pin shaft 12 as a circular point, and the actuating member 11 moves in an arc with the length of L1 as the radius to push the push member 8 to move forward. In the first gear 131, when the movable handle 5 moves, it moves with the pivot pin shaft 12 as a circular point, and the actuating member moves in an arc with the length of L3 as the radius to push the push member 8 to move forward. Since L1>L3, when the same force F is applied on the movable handle, the push member is pushed forward a further distance in the gear 132. Therefore, in the gear 132, the glue gun is suitable for glue with lower viscosity, and a longer pushing course can be achieved with a smaller pushing force. By changing the gear of the pivot pin shaft 12, the spacing between the pivot pin shaft 12 and the actuating member 11 is changed, such that the pushing force acting on the push member 8 by the actuating member 11 is different, so as to change the pushing course of the push rod 2, so it can adapt to fluid with a different fluidity. In other words, in this embodiment, by adjusting the ratio of the spacing between the pivot pin shaft 12 and the force application point 52 to the spacing between the pivot pin shaft 12 and a force bearing point (i.e., a point where the actuating member 11 contacts the push member), the adjustment of the force applied on the push member and the switching between transmission rates (i.e., speeds at which the push rod is pushed) are realized.

In other embodiments, the sliding groove 13 may be provided on the fixed handle 5, and the sliding groove 13 is provided with two or more gears. The pivot pin shaft 12 is arranged to be slidable in the sliding groove 13 so as to enable switching between the gears 131 and 132.

Embodiment 2

Figure 9:
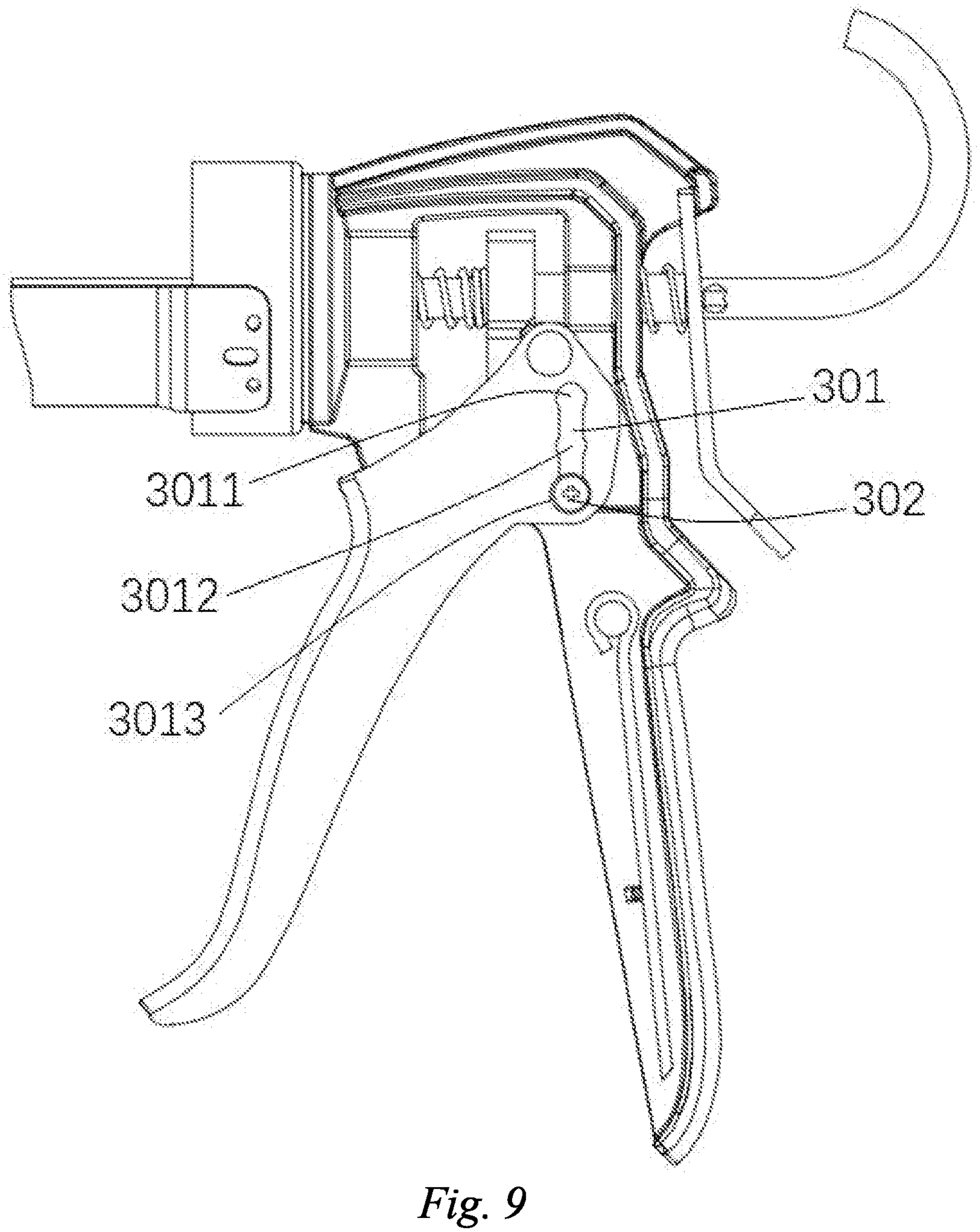
FIG. 9 is a schematic diagram showing the structure of a linear sliding groove in FIG. 5.

In other embodiments, as shown in FIGS. 5 to 9, the tension spring 6 between the movable handle 5 and the fixed handle 16 is removed. The pivot pin shaft 12 is provided as a stepped pin shaft 102, and the stepped pin shaft 102 has a pressing end and an end fixed to a screw 101. The pressing end is sheathed with a spring 104 and a spacer 105. The stepped pin shaft 102 has a first shaft diameter portion 107 and a second shaft diameter portion 108 (see FIG. 8). The sliding groove 103 has a first gear 1031 and a second gear 1032. The first gear 1031 and the second gear 1032 may be respectively located at two end portions of the sliding groove 103. The widths of the sliding groove 103 at the first gear 1031 and the second gear 1032 are greater than the width of other part (i.e., a middle portion connecting the first gear 1031 and the second gear 1032) of the sliding groove 103. The stepped pin shaft 102 may slide in the sliding groove 103, so as to move to the first gear 1031 or the second gear 1032. The shaft diameter of the first shaft diameter portion 107 is greater than the width of the middle portion of the sliding groove 103, and the shaft diameter of the second shaft diameter portion 108 is smaller than the width of the sliding groove 103. Under the biasing action of the spring 104, the first shaft diameter portion 107 is in the gear 1031 or 1032, and when the pressing end is pressed, the stepped pin shaft 102 moves axially such that the second shaft diameter portion 1032 goes into the gear 1031 or 1032, and at the same time, the shaft diameter of the second shaft diameter portion 1032 is smaller than the width of the sliding groove 103, such that the stepped pin shaft 102 may be moved to slide along the sliding groove 103, thus making the stepped pin shaft 102 move from one gear to another for gear switching. When the pressing end is released, the stepped pin shaft 102 moves axially in the opposite direction under the action of a restoring force of a spring 104, such that the first shaft diameter portion 107 goes into the current gear again. Since the shaft diameter of the first shaft diameter portion 107 is greater than the width of the sliding groove 103, the stepped pin shaft 102 is fixed at the current position of the sliding groove 103, thereby fixing the stepped pin shaft 102 in the current gear. Preferably, as shown in FIG. 9, the sliding groove 301 is linear and has multiple gears 3011, 3012 and 3013. The widths of the sliding groove 301 at the gears are greater than the widths of other parts (i.e. parts between adjacent gears). The stepped pin shaft 302 slides in the sliding groove 301 to realize the switching between the gears. In this embodiment, by changing the position of the stepped pin shaft in the sliding groove, the stepped pin shaft can be in different gears. In this case, the spacing between the stepped pin shaft and the actuating member 11 is changed, so the vertical spacing between the stepped pin shaft and the force application point on the movable handle 5 is changed, such that the pushing force acting on the push member 8 by the actuating member 11 is different, so as to change the pushing course of the push rod 2, so it can adapt to fluid with a different fluidity. In other words, in this embodiment, by adjusting the ratio of the spacing between the stepped pin shaft and a force application point to the spacing between the stepped pin shaft and a force bearing point (i.e., a point where the actuating member 11 contacts the push member), the adjustment of the force applied on the push member and the switching between transmission rates (i.e., speeds at which the push rod is pushed) are realized.

Embodiment 3

Figure 10:
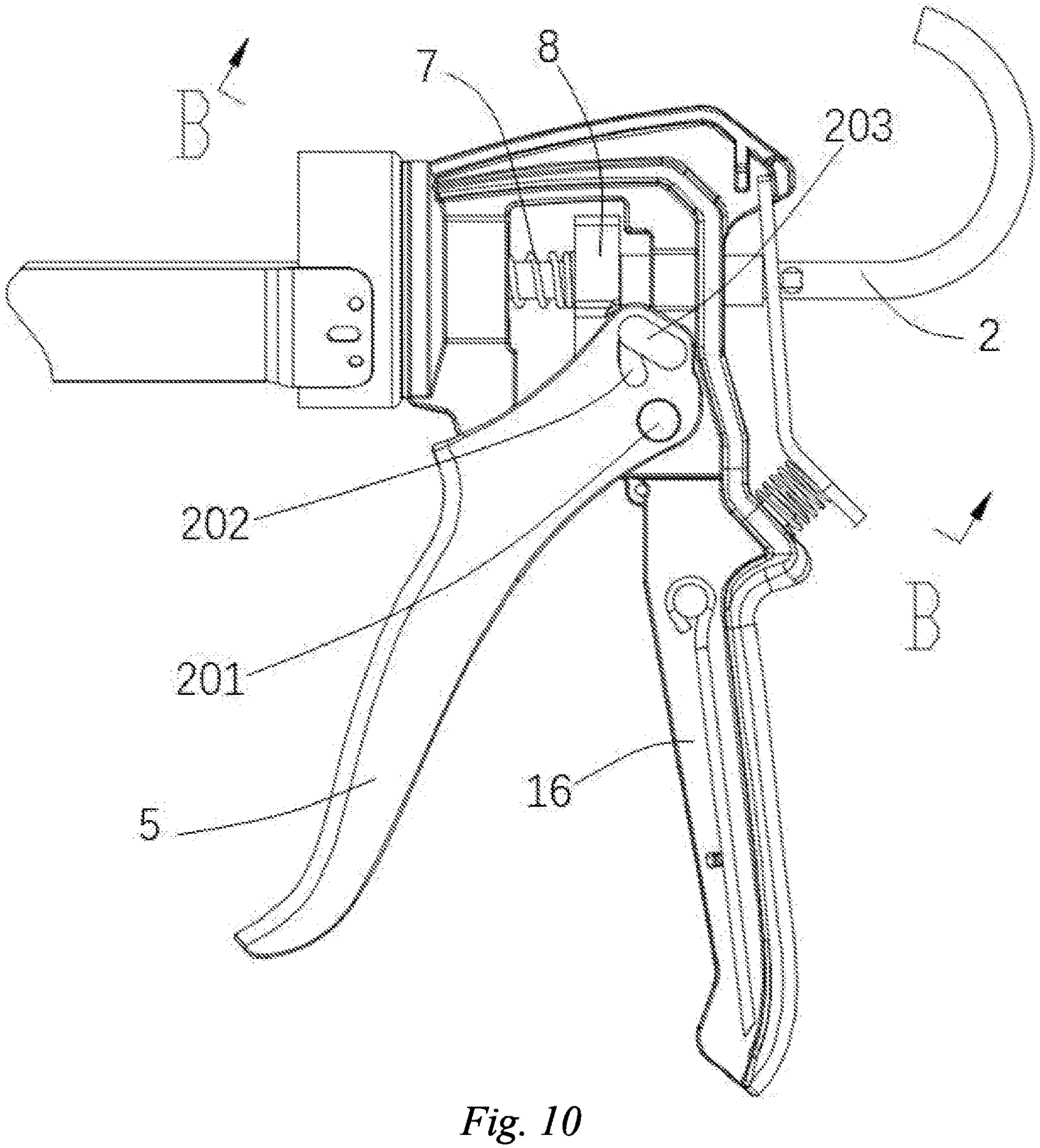
FIG. 10 is a schematic diagram showing the structure of a glue gun according to Embodiment 3 of the present invention.
Figure 11:
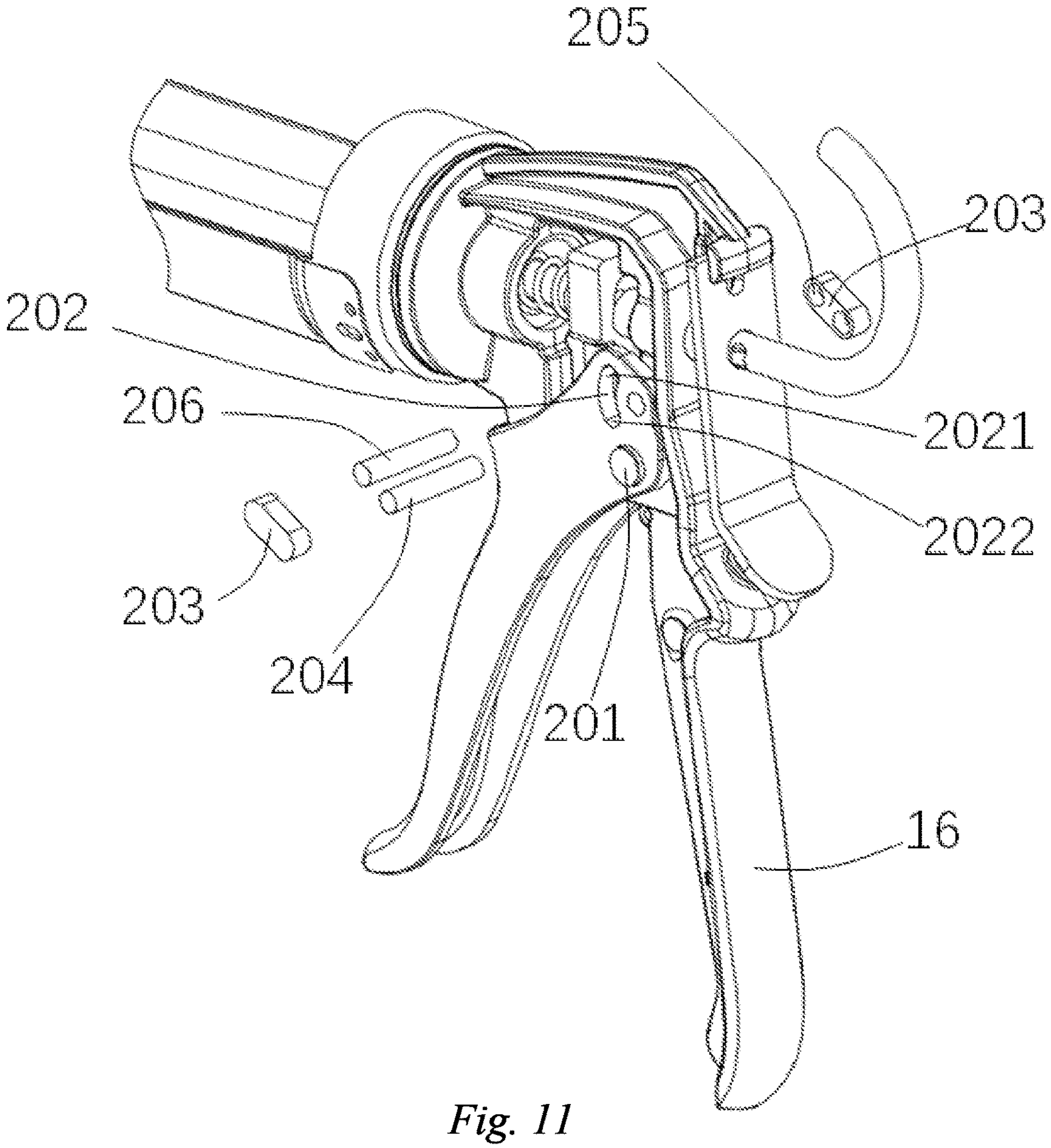
FIG. 11 is a schematic diagram showing a partial structure in FIG. 10.
Figure 12:
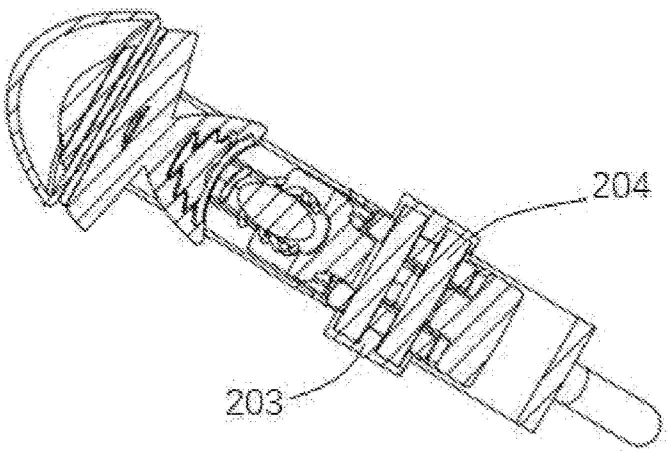
FIG. 12 is a section view of an actuating member in FIG. 10.

FIGS. 10 to 12 show another preferred embodiment of the present invention. The movable handle 5 is hinged to the fixed handle 16 by means of a pivot pin shaft 201. The movable handle 5 is further provided with a sliding groove 202. The actuating member further includes a pivot 204 and an actuating part 206 in contact with the push member 8. The actuating part 206 is arranged to be slidable in the sliding groove 202 around the pivot 204. The sliding groove 202 has a first gear 2021 and a second gear 2022. The first gear 2021 and the second gear 2022 may be respectively located at two ends of the sliding groove 202. A shift member 203 is connected to the pivot 204 and the actuating part 206, and the actuating part 206 slides between two ends of the sliding groove 202 by means of the shift member 203, i.e. realizing the changes in the position where the actuating part 206 makes contact with the push member 8 to achieve switching between the gears 2021 and 2022. When the actuating part 206 is in different gears, the spacing between the actuating part 206 and the pivot pin shaft 201 is different, and the vertical spacing between the pivot pin shaft 201 and a force application point on the movable handle 5 is different, such that the pushing force acting on the push member 8 by the actuating part 206 is different, so as to change the pushing course of the push rod 2, so it can adapt to fluid with a different fluidity. In Embodiment 1 and Embodiment 2, by changing the gear of the pivot pin shaft, the purpose of changing the spacing between the pivot pin shaft and the actuating member is achieved; while in this embodiment, the change in the spacing between the actuating part and the pivot pin shaft is achieved by changing the gear of the actuating part 206. In other words, in this embodiment, by adjusting the ratio of the spacing between the pivot pin shaft 201 and a force application point to the spacing between the pivot pin shaft 201 and a force bearing point (i.e., a point where the actuating part 206 contacts the push member 8), the adjustment of the force applied on the push member and the switching between transmission rates (i.e., speeds at which the push rod is pushed) are realized.

Embodiment 4

Figure 13:
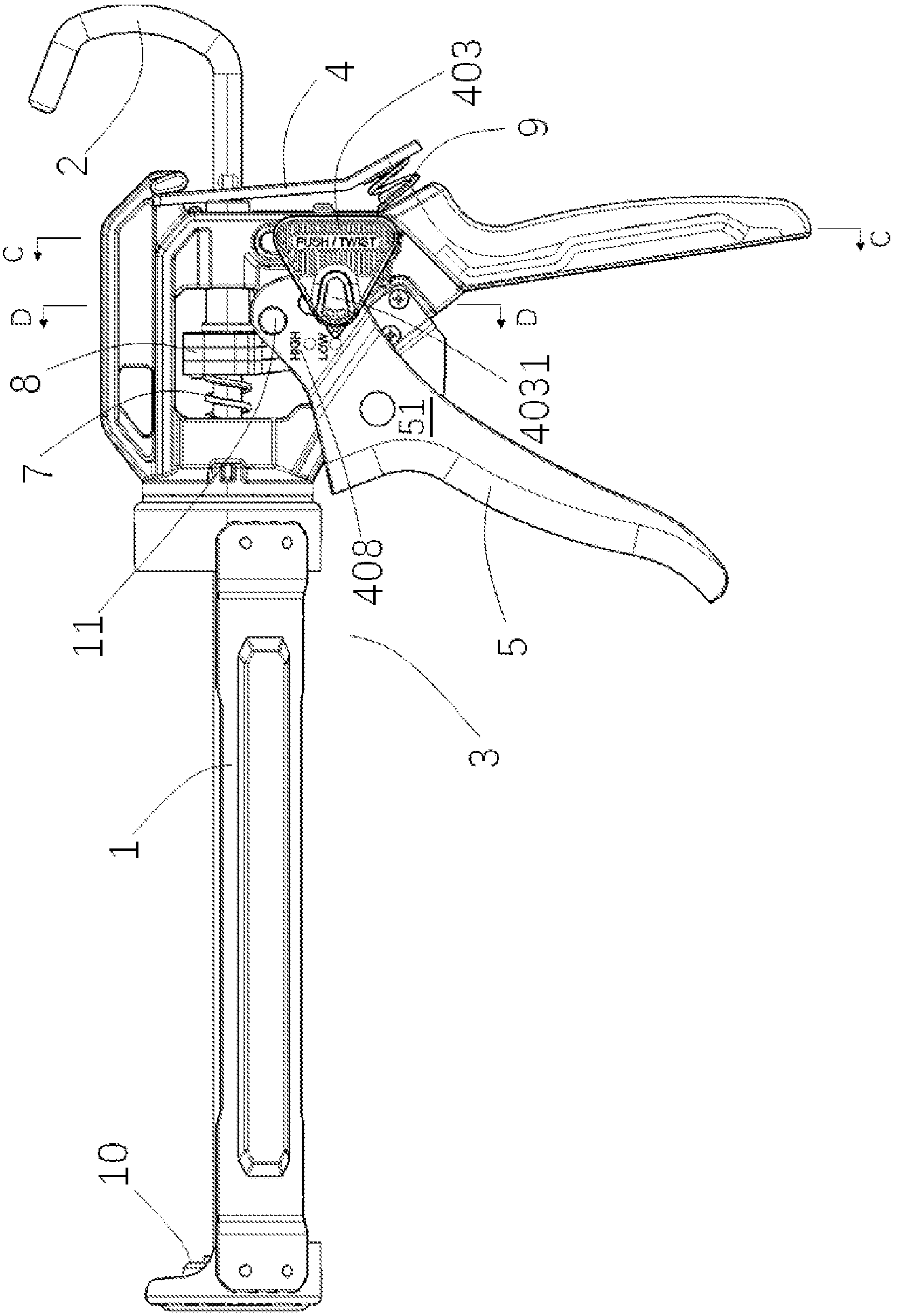
FIG. 13 is a schematic diagram showing the structure of a glue gun according to Embodiment 4 of the present invention.
Figure 14:
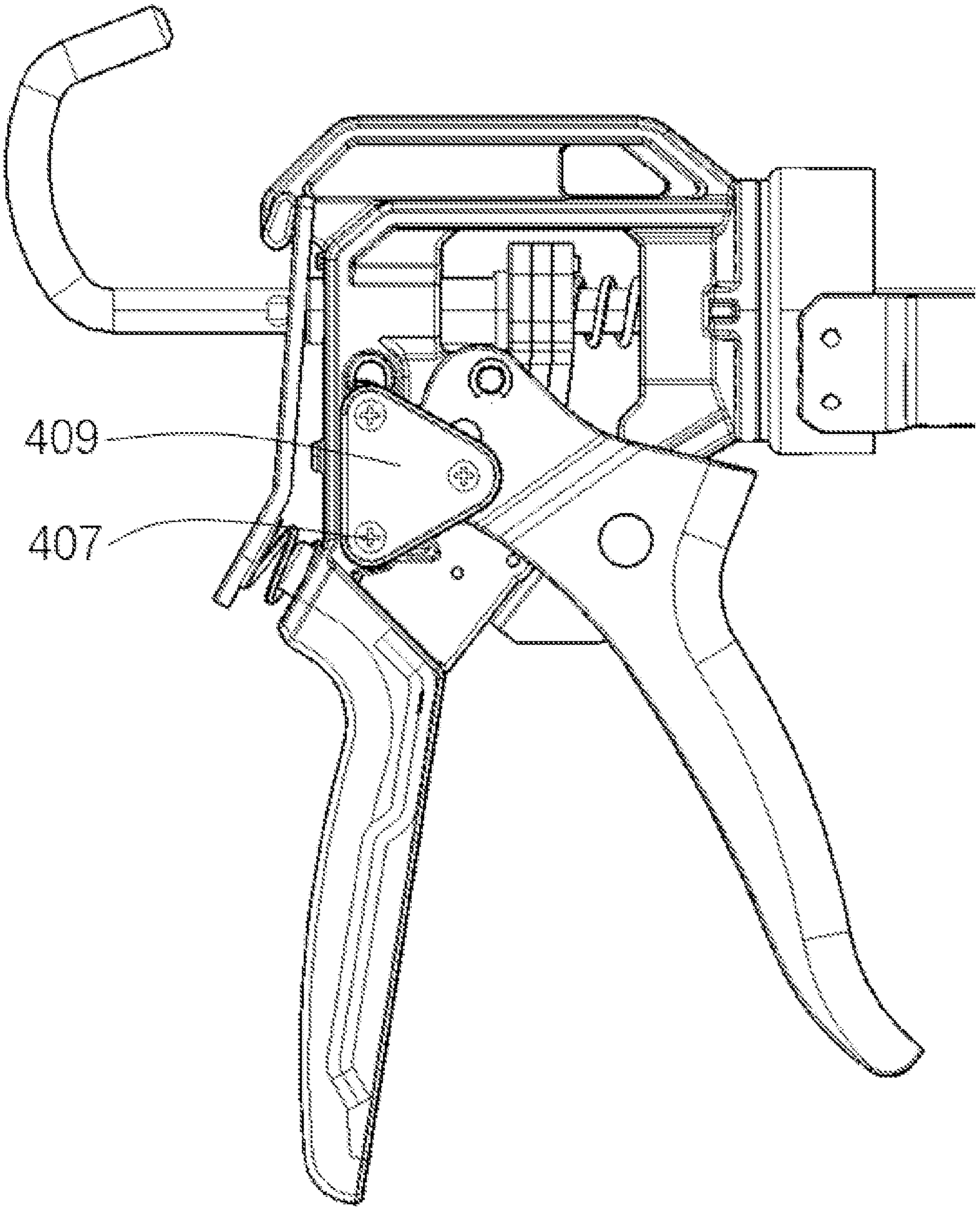
FIG. 14 is a rear view of the part of FIG. 13.

FIGS. 13 to 19 show another preferred embodiment of the present invention. Referring to FIG. 13, most features of this embodiment are the same as those of Embodiment 1. For example, components such as the push member 8, the push rod 2, the push body 10, the main body 3, the accommodation part 1, the brake 4, the movable handle 5, the restoring spring 7, the compression spring 9, the actuating member 11 and the fixed handle 16, and their connection modes are the same as those in Embodiment 1, which will not be repeated here. This embodiment is different from Embodiment 1 in that the way of shifting gears of the pivot pin shaft is different.

Figure 15:
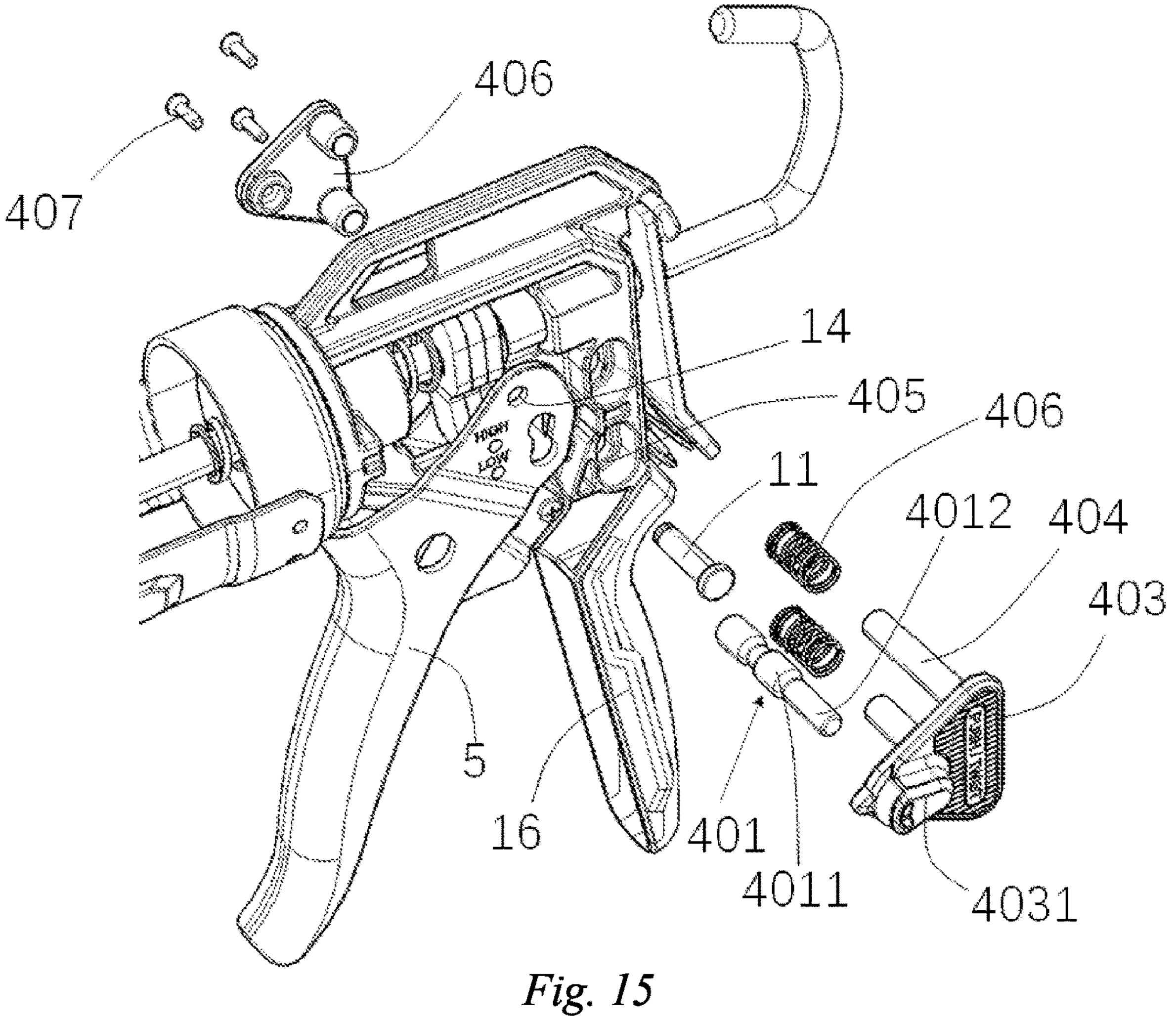
FIG. 15 is a schematic exploded diagram of FIG. 13.
Figure 16:
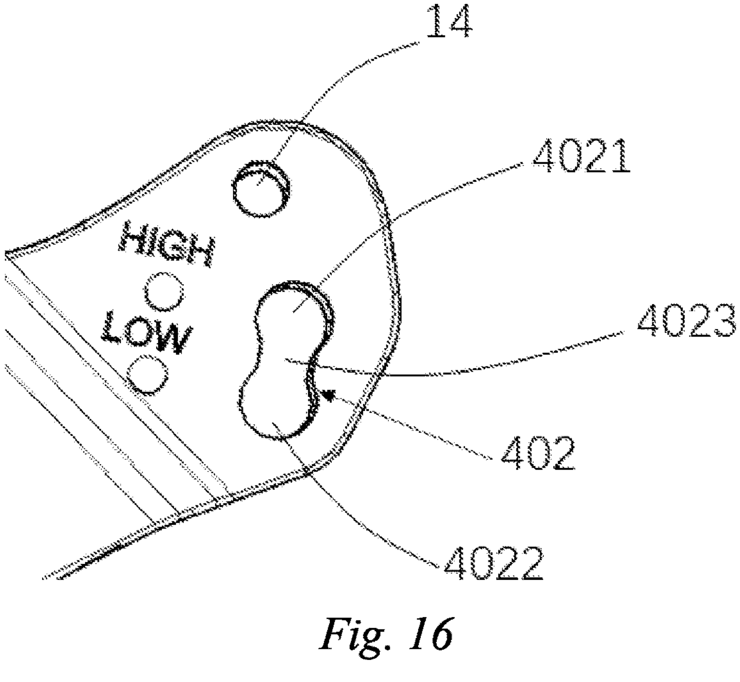
FIG. 16 is a partially enlarged diagram of FIG. 13.
Figure 17:
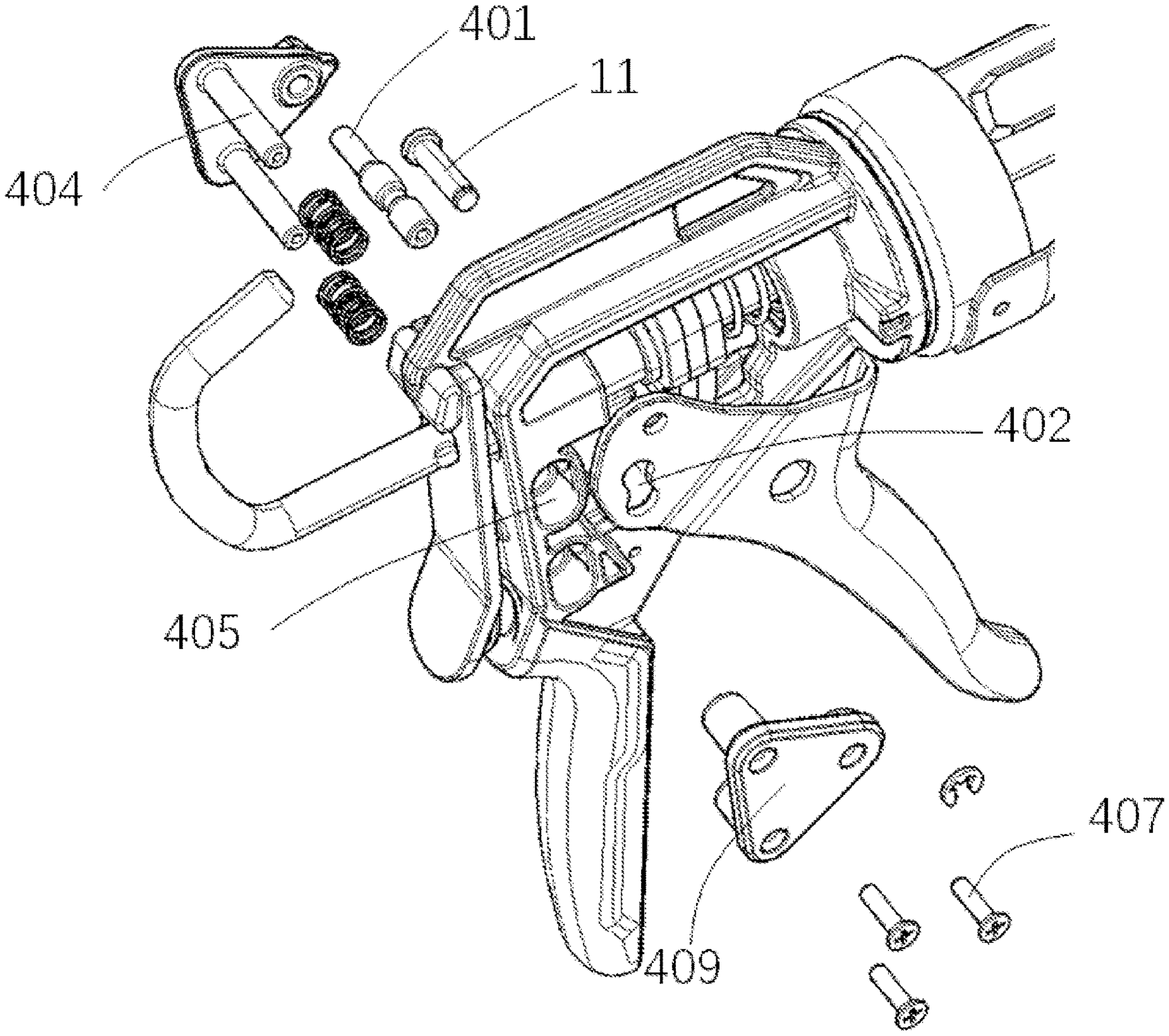
FIG. 17 is a schematic diagram from another perspective of FIG. 15.
Figure 18:
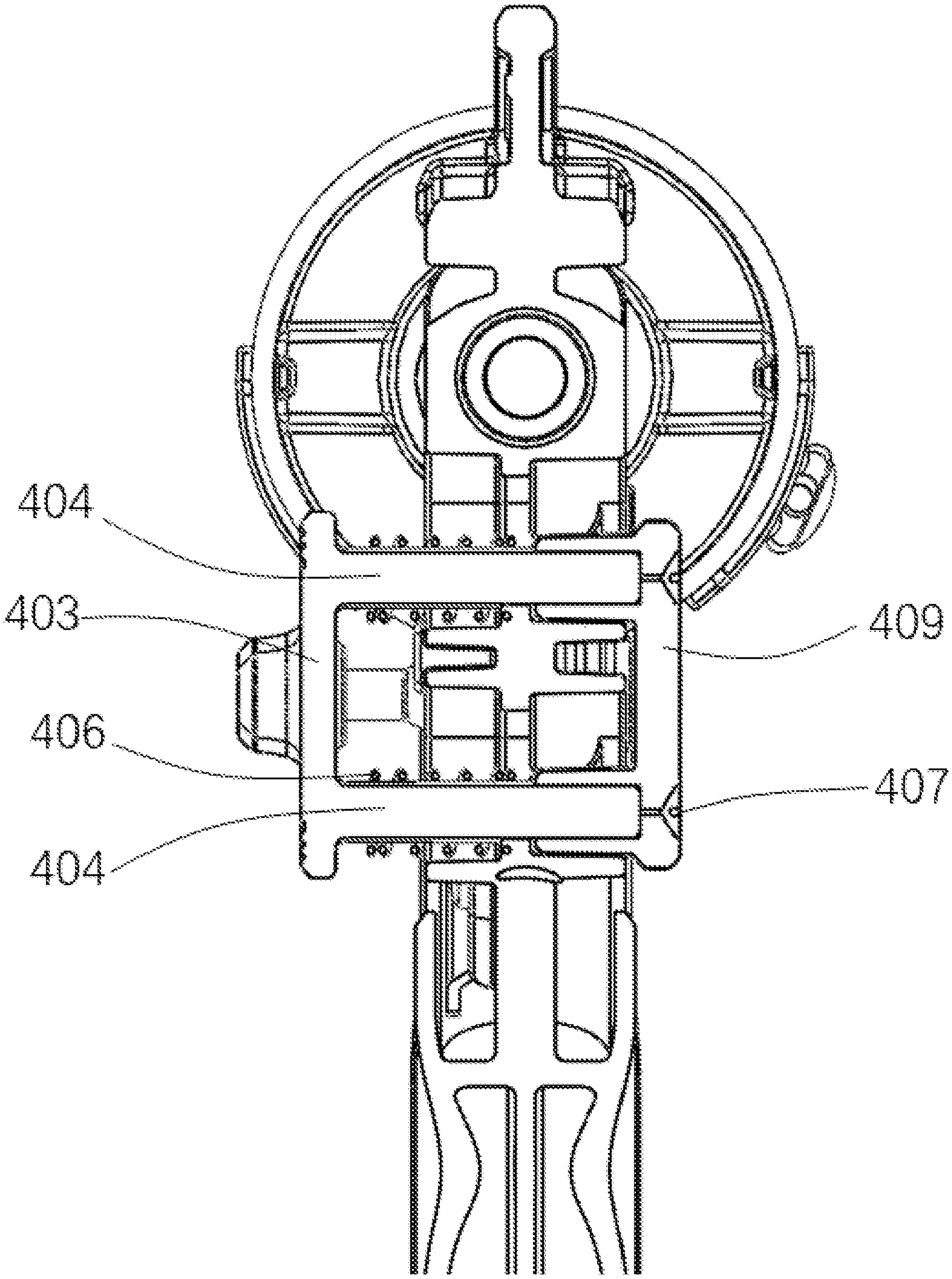
FIG. 18 is a C-C section view of FIG. 13.
Figure 19:
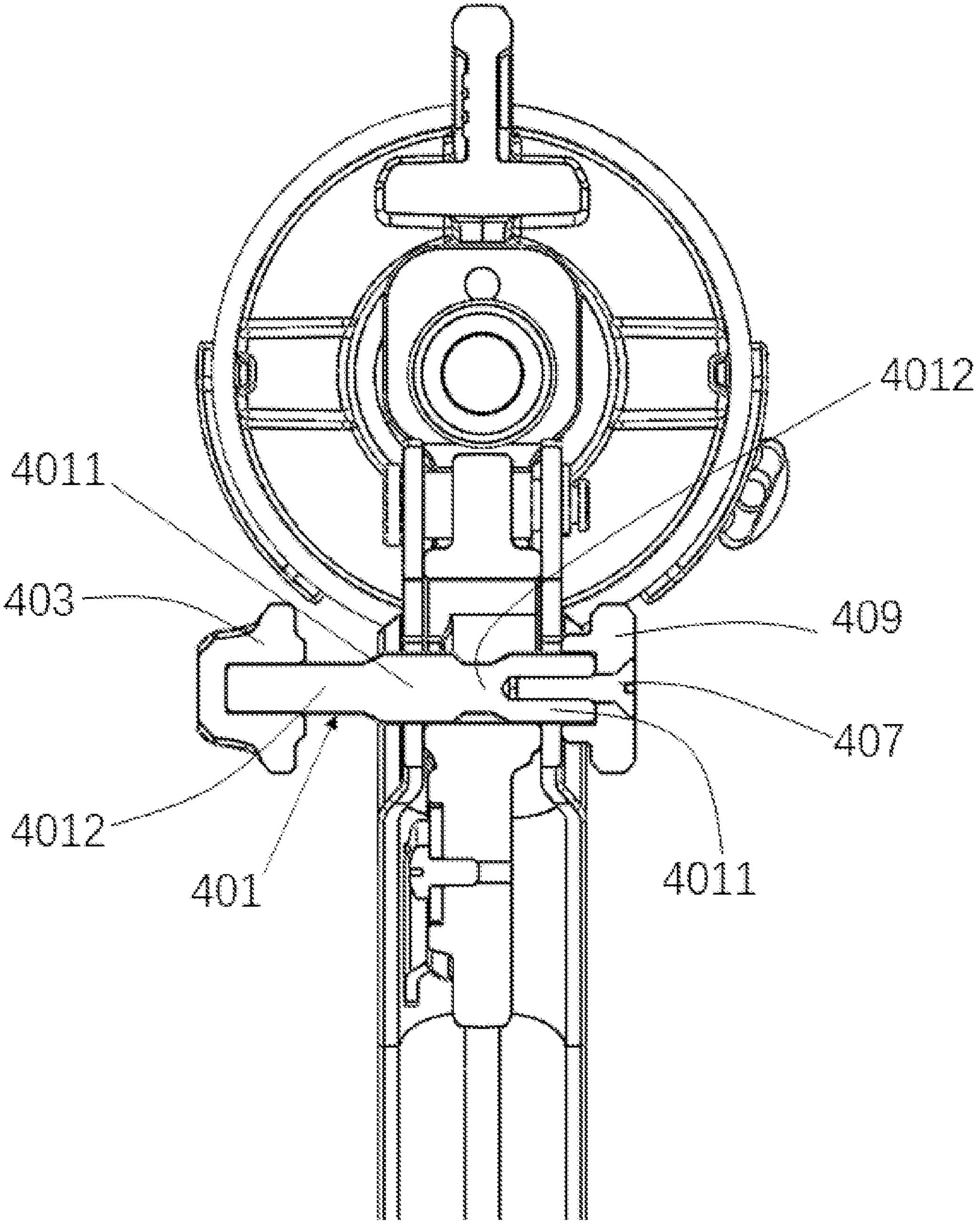
FIG. 19 is a D-D section view of FIG. 13.

Referring to FIG. 15, in this embodiment, the actuating member 11 passes through a hole 14 in the movable handle 5 and makes contact with the push member 8 to drive the push member 8, so as to move the push rod 2. The movable handle 5 is connected to the fixed handle 16 via a pivot pin shaft 401. When a force is applied to the movable handle 5, the movable handle 5 can rotate around the pivot pin shaft 401 relative to the fixed handle 16. The movable handle 5 is provided with a sliding groove 402. Referring to FIG. 16, the sliding groove 402 has a first gear 4021 and a second gear 4022. The first gear 4021 and the second gear 4022 can be respectively arranged at both ends of the sliding groove 402, that is, holes are formed at both ends of the sliding groove 402 as the first gear 4021 and the second gear 4022, and the two holes communicate with each other to form a communication portion 4023, thus forming the sliding groove 402, where the diameter of the holes is greater than the width of the communication portion 4023. The pivot pin shaft 401 can slide in the sliding groove 402 to move to the first gear 4021 or the second gear 4022. Referring to FIGS. 15 and 19, the pivot pin shaft 401 is of a stepped pin shaft structure, including a first shaft diameter portion 4011 and a second shaft diameter portion 4012. The shaft diameter of the first shaft diameter portion 4011 is greater than the width of the communication portion 4023 of the sliding groove 402, and the shaft diameter of the second shaft diameter portion 4012 is smaller than the width of the communication portion 4023 of the sliding groove 402. When the first shaft diameter portion 4011 is in the first gear 4021 or the second gear 4022 of the sliding groove 402, the pivot pin shaft 401 cannot slide along the sliding groove 402, thus keeping the pivot pin shaft 401 in the current gear. When the second shaft diameter portion 4012 is located in the sliding groove 402, since the shaft diameter of the second shaft diameter portion 4012 is smaller than the width of the sliding groove 402, the fixing of the pivot pin shaft 401 can be released, such that the pivot pin shaft 401 can slide along the sliding groove 402 under the action of an external force to switch gears.

Referring to FIGS. 15 and FIGS. 17 to 19, one end of the pivot pin shaft 401 is connected to a pressing portion 403, the pressing portion 403 is further provided with at least one positioning pin 404, the axial direction of the positioning pin 404 is parallel to the axial direction of the pivot pin shaft 401, the fixed handle 16 is provided with at least one positioning groove 405, one positioning pin 404 passes through one positioning groove 405, and the positioning pin 404 can slide along the positioning groove 405 in a sliding direction substantially same as that of the pivot pin shaft 401 in the sliding groove 402. The positioning pin 404 is sheathed with a spring 406. When the pressing portion 403 is pressed, the pivot pin shaft 401 and the positioning pin 404 both move along their respective axial directions, the second shaft diameter portion 4012 of the pivot pin shaft 401 moves into the sliding groove 402, and the spring 406 over the positioning pin 404 is compressed. Then the pressing portion 403 is driven to move along the length direction of the sliding groove 402, the pivot pin shaft 401 slides in the sliding groove 402, and the positioning pin 404 slides in the positioning groove 405. When the pivot pin shaft 401 is switched to a preset gear, the pressing portion 403 is released, and under the biasing action of the spring 406, the pressing portion 403 is restored in position, and both the pivot pin shaft 401 and the positioning pin 404 move along with the pressing portion 403. At this time, the first shaft diameter portion 4011 of the pivot pin shaft 401 moves to the gear 4021 or 4022 of the sliding groove 402, so that the pivot pin shaft 401 is kept in the current gear.

Preferably, the number of the positioning pins 404 are two. Accordingly, the fixed handle 16 is provided with two positioning grooves 405 corresponding to the positioning pins 404, each positioning pin 404 being sheathed with a spring 406. The two positioning pins 404 and the pivot pin shaft 401 form a triangle, where the two positioning pins 404 may be on a same straight line, the direction of which may be the same as the length directions of the positioning grooves 405. The shape of the pressing portion 403 may be substantially triangular.

A blocking piece 409 is provided on a side opposite the pressing portion 403, and the other ends of the pivot pin shaft 401 and the positioning pins 404 are all connected to the blocking piece 409 by fasteners 407 such as screws.

Marks 408 are provided on the movable handle 5 to indicate that the pivot pin shaft 401 is in different gears. A boss 4031 is provided on an outer surface of the pressing portion 403, which is convenient for a user to operate the pressing portion 403 to press the pressing portion 403 and push the pressing portion 403.

Similar to Embodiments 1 to 3, in this embodiment, when the pivot pin shaft 401 is in different gears in the sliding groove 402, the spacing between the pivot pin shaft 401 and the actuating member 11 (i.e., the distance between the axis of the pivot pin shaft 401 and the axis of the actuating member 11 on a side face 51 of the movable handle 5) is different, and the vertical spacing between the pivot pin shaft 401 and a force application point 52 on the movable handle 5 is different, such that the contact position of the actuating member 11 and the push member 8 is different and the pushing force acting on the push member 8 is different, so as to change the pushing course of the push rod 2, so it can adapt to fluid with a different fluidity. In other words, in this embodiment, by adjusting the ratio of the spacing between the pivot pin shaft 401 and a force application point to the spacing between the pivot pin shaft 401 and a force bearing point (i.e., a point where the actuating member 11 contacts the push member), the adjustment of the force applied on the push member and the switching between transmission rates (i.e., speeds at which the push rod is pushed) are realized.

Embodiment 5

Figure 20:
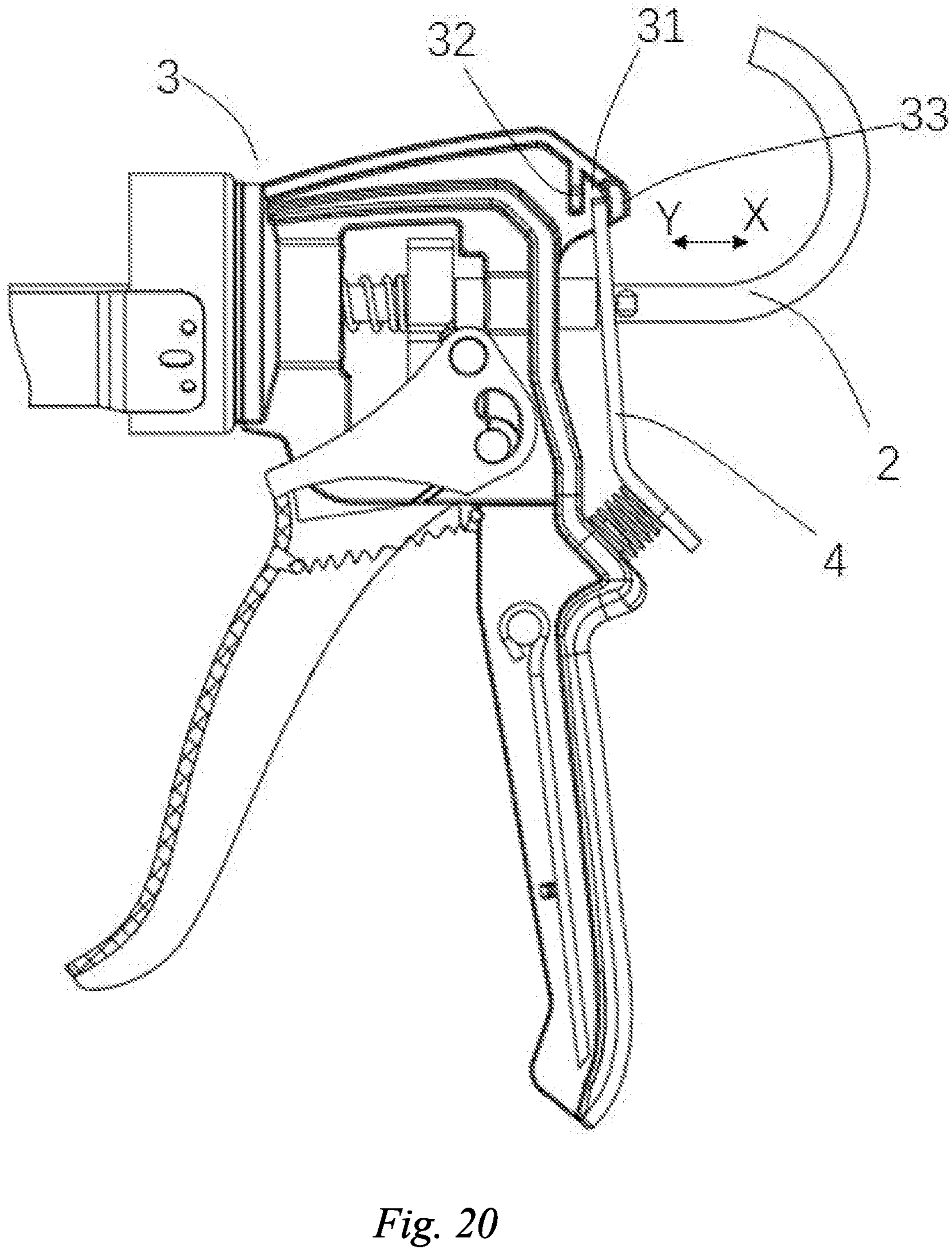
FIG. 20 is a schematic diagram showing a connection between a brake and a main body in Embodiments 1 to 4.
Figure 21:
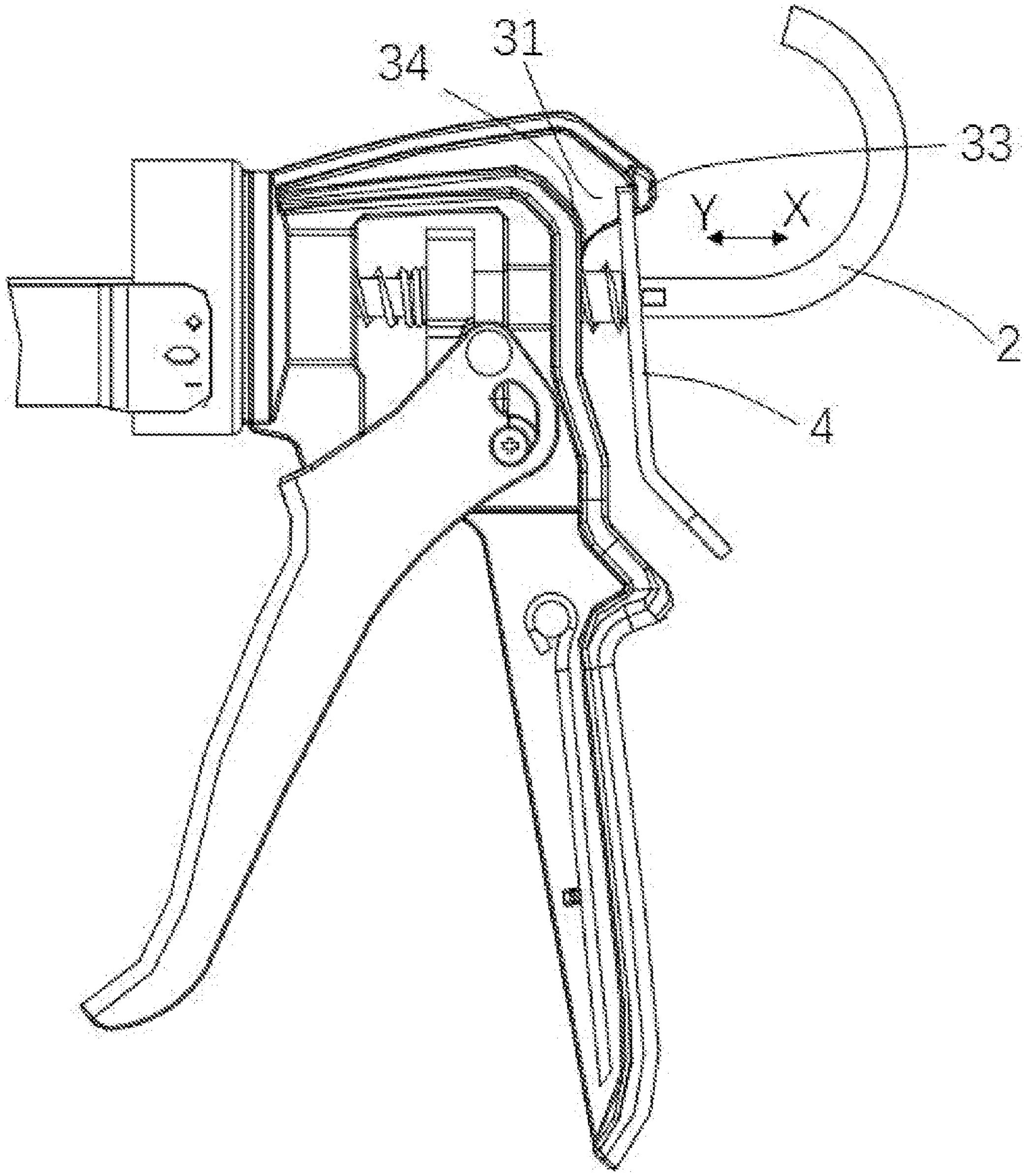
FIG. 21 is a schematic diagram showing another connection between a brake and a main body in Embodiments 1 to 4.

In Embodiments 1 to 4, referring to FIG. 20, an upper portion of the main body 3 close to the brake 4 is provided with the limiting groove 31, and one end (a top end 41) of the brake 4 moves in the limiting groove 31. Under the constraints of the first limiting end 32 and the second limiting end 33 of the limiting groove 31, in the glue feeding, the brake 4 moves from the second limiting end 33 to the first limiting end 32; and after the glue feeding is finished, the handle is released, and the brake 4 will move from the first limiting end 32 to the second limiting end 33. Of course, the first limiting end 32 may also be removed, and an end portion 34 of the main body 3 facing the brake 4 is taken as the limiting end (see FIG. 21). In the above two ways, no matter which way it is, the brake 4 has an idle stroke during the movement process, that is, during the glue feeding process, the actuating member 4 will move together with the push rod 2, and there is no relative displacement between them. When the glue gun is not working, after the handle is released, the brake 4 will move backwards (in an X direction) together with the push rod 2 (see the direction X in FIG. 20), thus releasing the force acting on the glue to release the internal stress of the glue. At this time, the glue in the glue cylinder can be prevented from dripping any more.

However, in some application scenarios, it is desirable that after the handle is released, a continuous force is still applied on the glue in the glue cylinder, so that the glue can be dripping continuously. At this time, it is needed that after the handle is released, the brake 4 can be locked, so that the brake 4 will not move with the release of the handle, so as to keep it in a force-applying state and make the glue dripping continuously.

Meanwhile, whether to lock the brake 4 can be selected according to user requirements, that is, the brake 4 is set to switch between a locked state and a movable state. In order to solve this problem, this embodiment is improved on the basis of Embodiments 1 to 4, and the detailed description is as follows.

Figure 22:
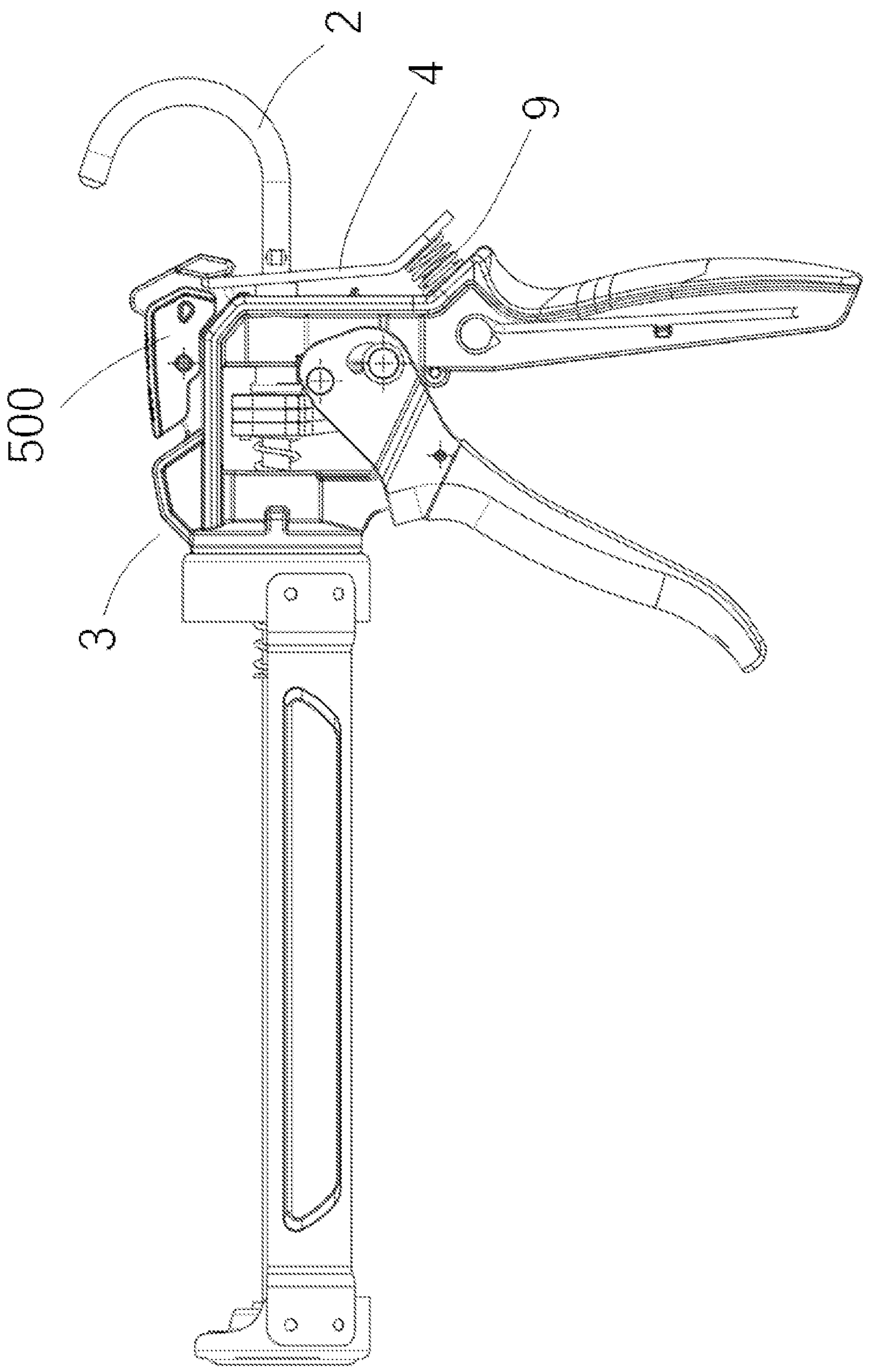
FIG. 22 is a schematic diagram showing the structure of a glue gun in a first state according to Embodiment 5.
Figure 23:
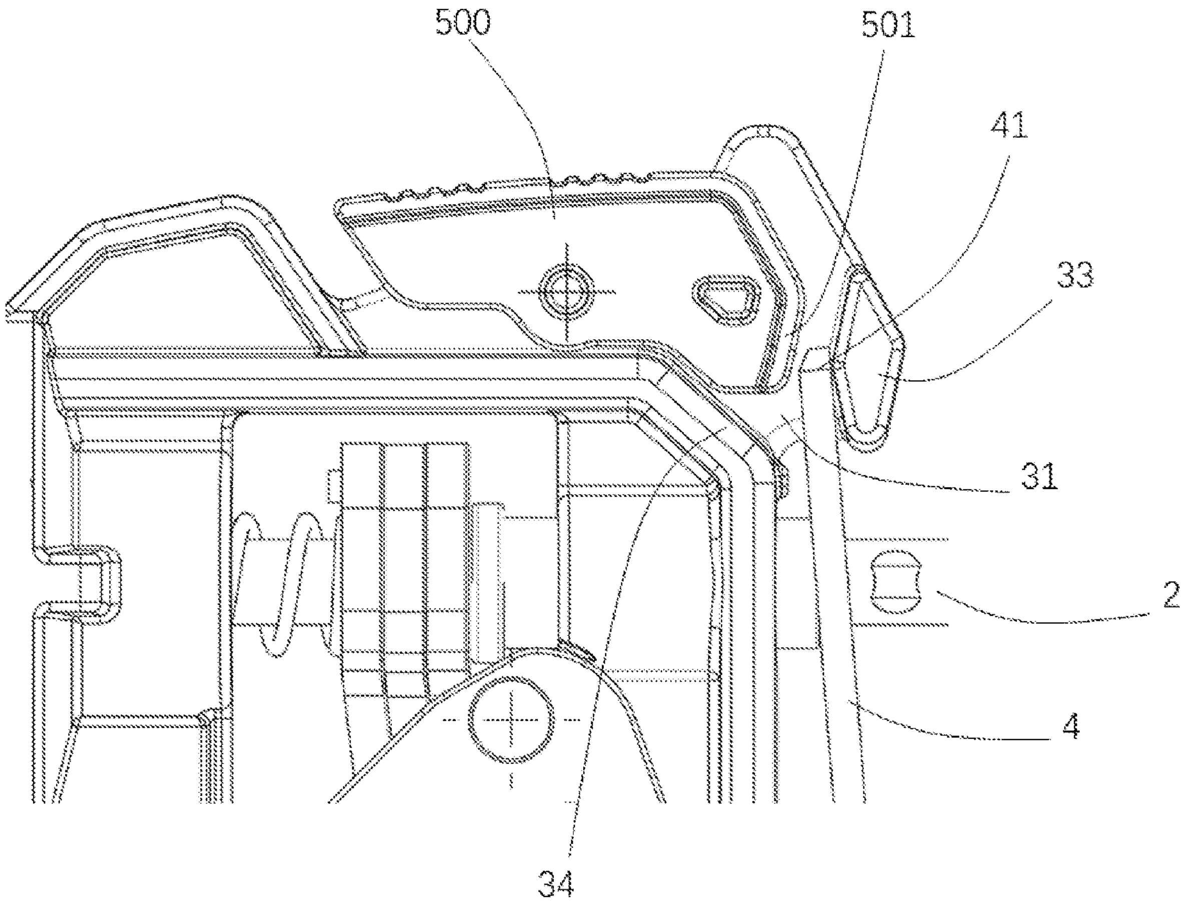
FIG. 23 is a schematic partially-enlarged diagram of FIG. 22.

Referring to FIGS. 22 to 25, the arrangement of the brake 4 is the same as that of Embodiments 1 to 4, that is, the brake 4 is arranged on the push rod 2, and the compression spring 9 is arranged between the brake 4 and the main body 3, the top end of the brake 4 cooperates with the limiting groove 31 of the main body 3, and the top end of the brake 4 can move back and forth in the limiting groove 31 (the forward direction is the Y direction, and the backward direction is the X direction). Referring to FIGS. 22 and 23, a movable member 500 is provided at the top of the main body 3, and an end portion 501 of the movable member 500 facing the brake 4 may be moved under the action of an external force. When the end portion 501 moves to a position (a first position) where it is in contact with the top end 41 of the brake 4 (or there is a very small gap between the end portion 501 and the top end 41), the end portion 501 locks the brake 4 together with the second limiting end 33, such that the brake 4 cannot move in the limiting groove 31, and the brake 4 will retain the push rod 2 and prevent the push rod 2 from moving. At this time, the glue gun is in a first state, that is, after the handle is released, the restoring force of the restoring spring 7 is not enough to overcome the force of the brake 4 on the push rod 2, such that the brake 4 remains in a state of retaining the push rod 2. The push rod 2 does not move, a force is still applied to the glue, and the internal stress of the glue is not released, so that the glue is still in a state of continuous dripping.

Figure 24:
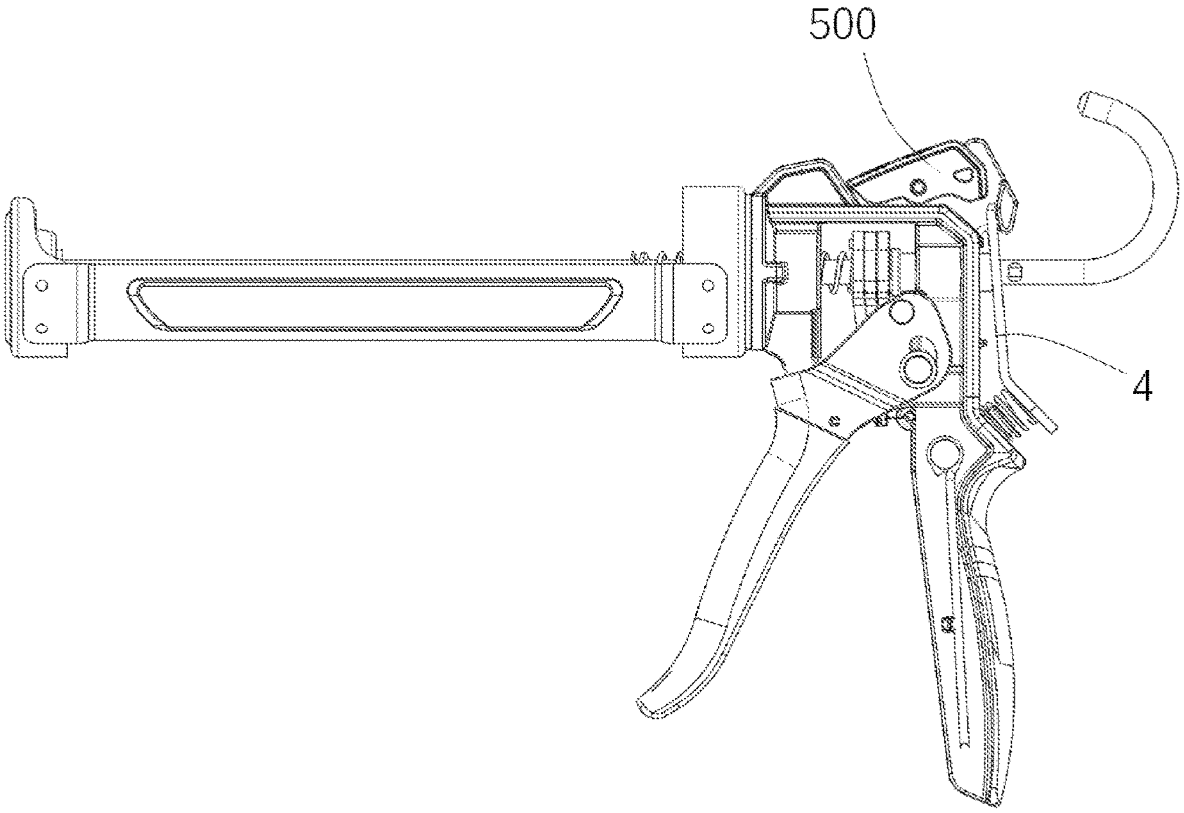
FIG. 24 is a schematic diagram showing the structure of a glue gun in a second state according to Embodiment 5.
Figure 25:
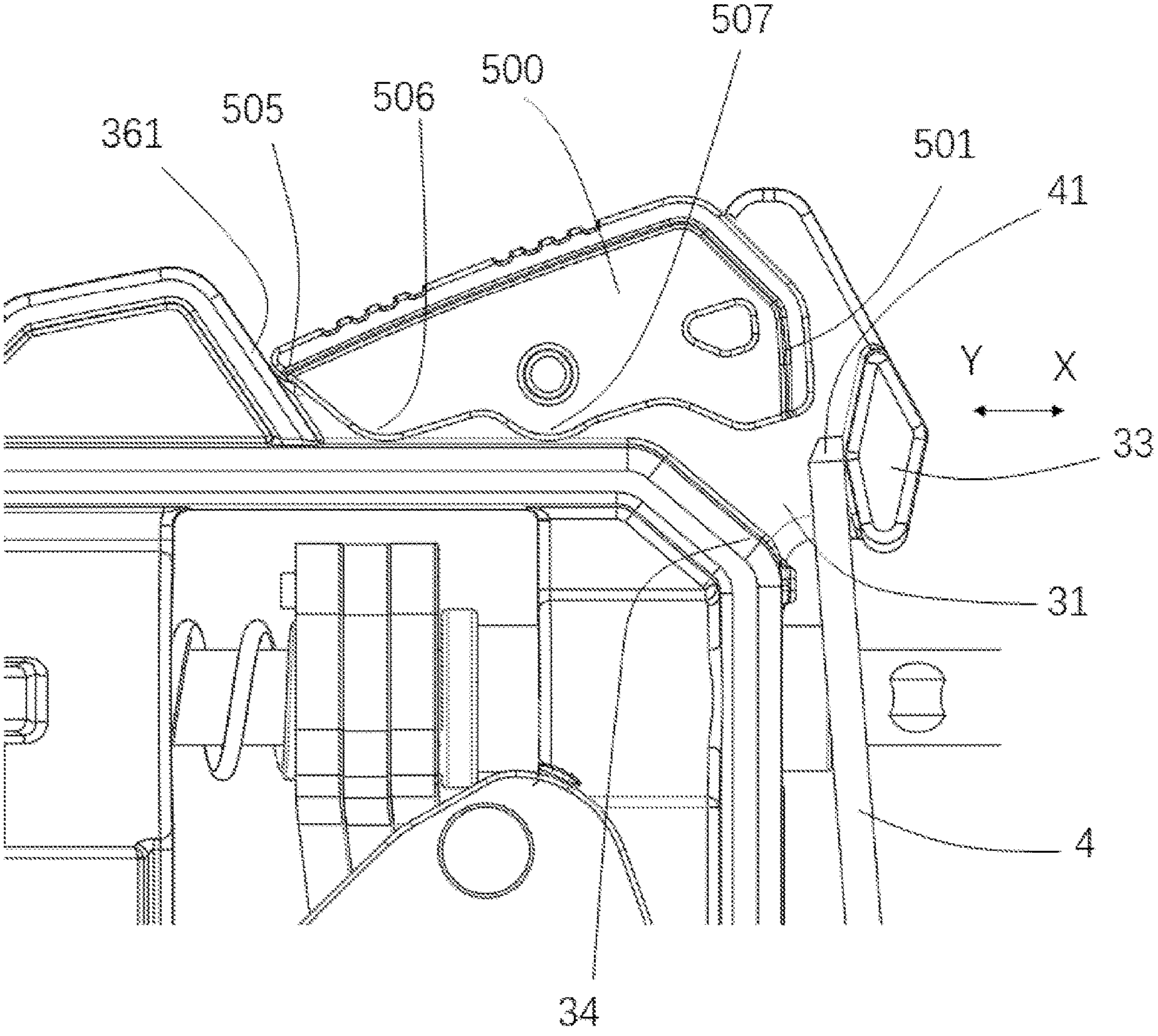
FIG. 25 is a schematic partially-enlarged diagram of FIG. 24.

As shown in FIGS. 24 and 25, a user applies an external force on the movable member 500 to move the end portion 501 of the movable member 500 to a position (a second position) away from the brake 4. At this time, the end portion 501 of the movable member 500 is no longer in contact with the top end of the brake 4, and in the entire movement stroke of the brake 4, the end portion 501 of the movable member 500 will not be in contact with the brake 4, that is to say, the movable member 500 will not interfere with the movement of the brake 4 in the limiting groove 31. The top end 41 of the brake 4 can move back and forth in the limiting groove 31, that is, the top end 41 of the brake 4 can move between the end portion 34 of the main body 3 and the second limiting end 33. When the brake 4 is located at the second limiting end 33, the brake 4 retains the push rod 2. In the glue feeding, the push member 8 is pushed to move toward the accommodation part 1, the push rod 2 and the brake 4 will accordingly move together, and the brake 4 moves from the second limiting end 33 to the end portion 34. There is no relative displacement between the push rod 2 and the brake 4, that is, the brake 4 has an idle stroke. When the brake 4 moves to the end portion 34, the brake 4 is blocked by the end portion 34 and does not move any more. At this time, the brake 4 will not retain the push rod 2, so that the push rod 2 can continue to move towards the accommodation part 1, and in this case, a relative displacement occurs between the push rod 2 and the brake 4. When the movable member 500 is in the second position, the glue gun is in a second state, that is, under the action of the restoring spring 7, the push member 8 will move away from the accommodation part, driving the push rod 2 to move together. When the push rod 2 moves to a position where it is retained by the brake 4, the brake 4 will also move together with the push rod 2. At this time, the brake 4 will move from the end portion 34 to the second limiting end 33 so as to release the force acting on the glue inside the glue cylinder, so that the internal stress of the glue inside the glue cylinder is released, thereby preventing the glue from flowing out of a glue outlet, that is, the glue does not drip any more.

The movable member 500 may adopt any suitable structure, as long as it can make the end portion of the movable member move to the first position (the position where the end portion is in contact with the top end 41 of the brake 4 and locks the brake 4) and move to the second position (the position where the end portion is out of contact with the top end 41 of the brake 4 and does not interfere with the movement of the brake 4), and any movable member meeting this requirement can be applied in this embodiment.

Figure 26:
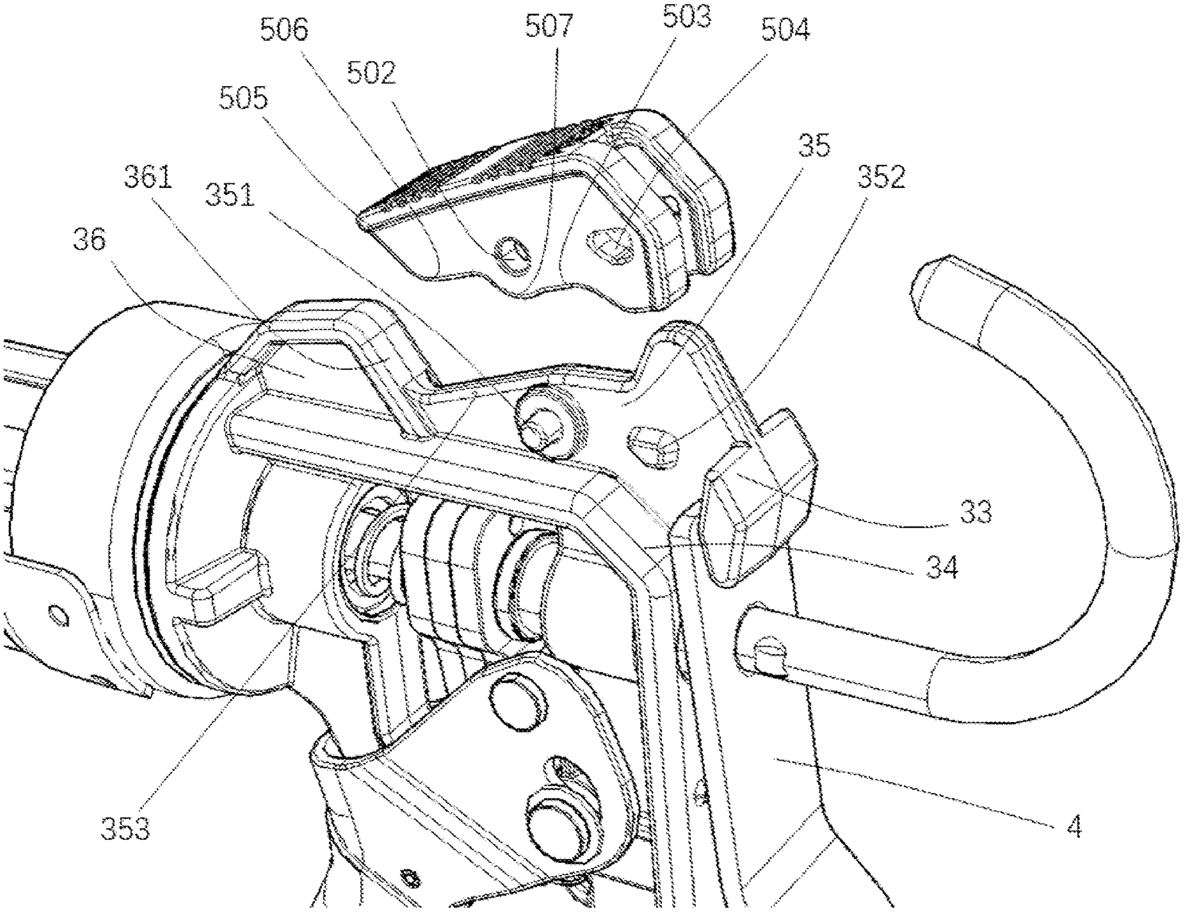
FIG. 26 is a schematic partially-exploded diagram of a glue gun according to Embodiment 5.

As shown in FIGS. 22 to 29, this embodiment provides a preferred implementation, as follows:

Referring to FIG. 26, a convex piece 35 is provided at the top of the main body 3. The convex piece 35 extends upward and obliquely rearward from the top of the main body 3. An end portion of the convex piece 35 away from the main body 3 is formed as a second limiting end 33. The second limiting end 33 and the end portion 34 of the main body 3 facing the brake 4 form the limiting groove 31 in an enclosing manner. The top end 41 of the brake 4 can move back and forth in the limiting groove 31. The movable member 500 is pivotally connected to the convex piece 35. Specifically, the convex piece 35 is provided with a pin shaft 351. A first through hole 502 is provided in the movable member 500. The pin shaft 351 is sheathed in the first through hole 502, so that the movable member 500 can rotate around the pin shaft 351. When the movable member 500 is rotated to the first position, the end portion 501 of the movable member 500 is in contact with the top end 41 of the brake 4 (or there is a very small gap between the top end 41 of the brake 4 and the end portion 501), thereby locking the brake 4. When the movable member 500 is rotated to the second position, the end portion 501 of the movable member is away from the brake 4, so that the brake 4 can move in the limiting groove 31, and its movement stroke is restricted by the end portion 34 of the main body 3 and the second limiting end 33.

Preferably, the first through hole 502 of the movable member 500 is located in the middle of the movable member 500.

An end face 503 of the movable member 500 facing the main body 3 may be matched with the main body 3 in shape. In this way, when the movable member 500 moves to the first position, the end face 503 of the movable member 500 is in contact with the main body 3, and because of their matching shapes, they are in closer contact (see FIG. 23). With this arrangement, the main body 3 can better restrict the movement of the movable member 500, so that the movable member 500 can move to the first position precisely. For example, the end portion 34 of the main body 3 close to the brake 4 is provided as an inclined face (the inclined face and the second limiting end 33 together form the limiting groove 31), and the end face 503 of the movable member 500 is also provided as an inclined face matching with that inclined face.

Figure 27:
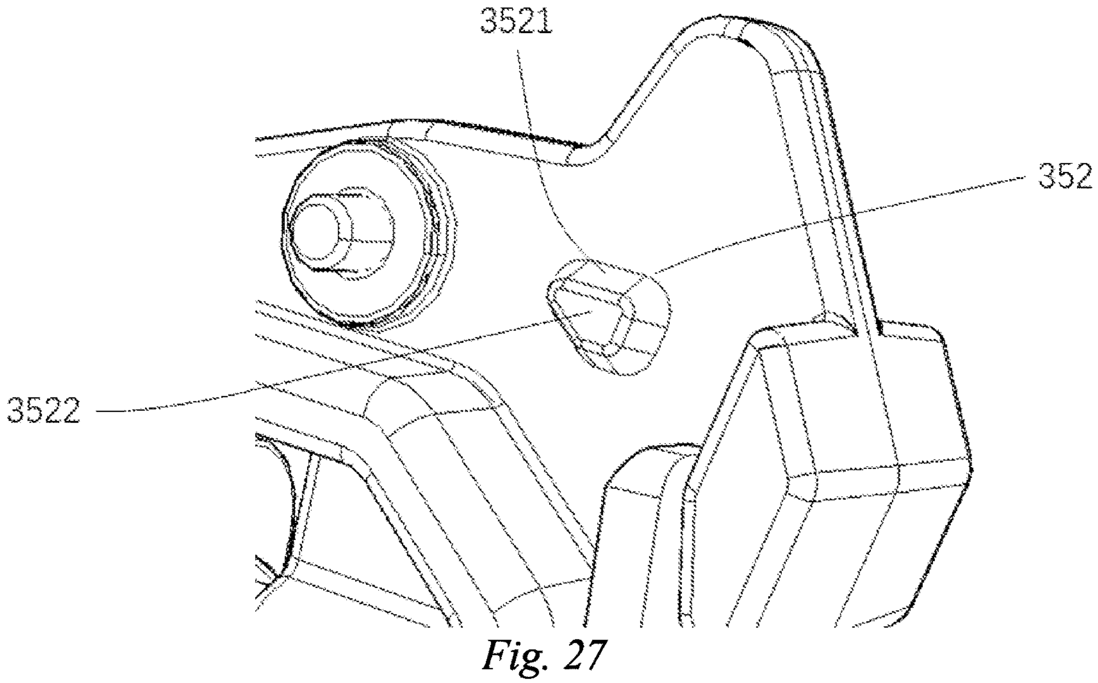
FIG. 27 is a schematic diagram showing the structure of a positioning boss of a glue gun according to Embodiment 5.
Figure 28:
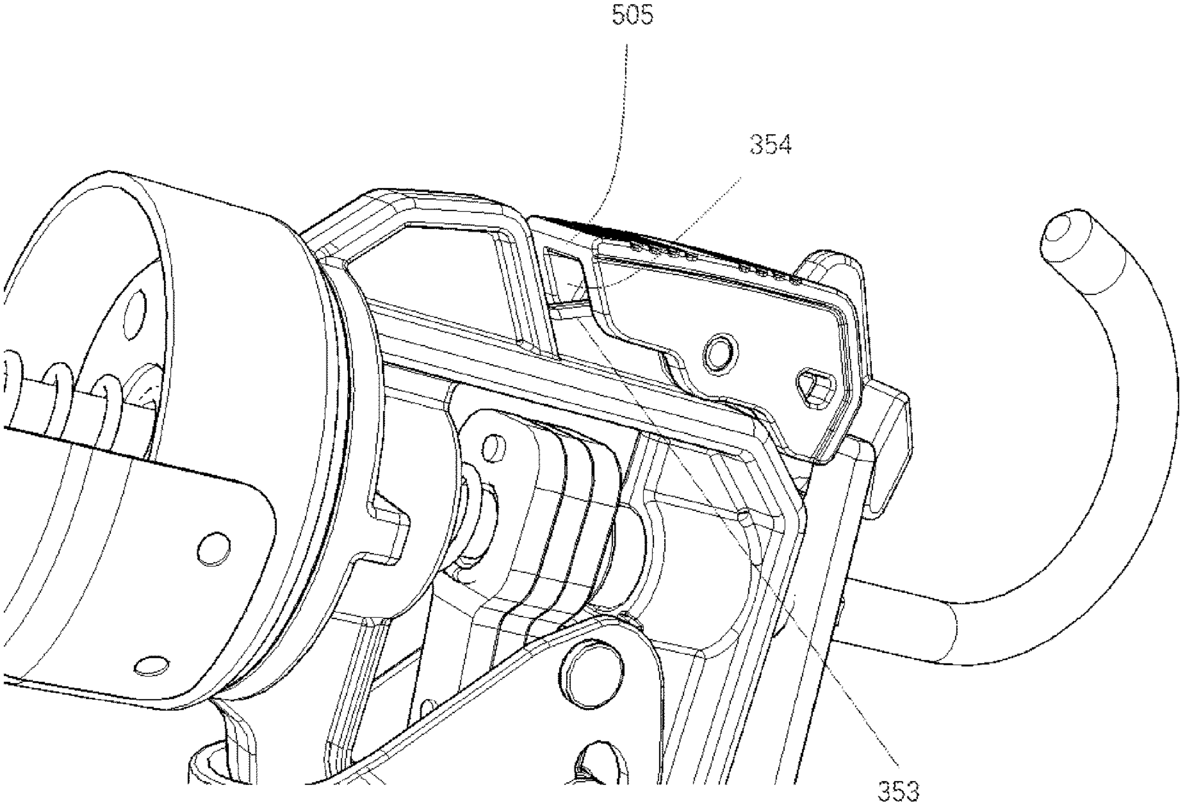
FIG. 28 is a schematic partially-enlarged diagram of a glue gun in a second state according to Embodiment 5.

In order to better position the movable member 500 in the first position, the movable member 500 is further provided with a second through hole 504, and correspondingly, a positioning boss 352 is provided on the convex piece 35. When the movable member 500 moves to the first position, the second through hole 504 faces the positioning boss 352, so that a part of the positioning boss 352 may be embedded into the second through hole 504 and the movable member 500 can be accurately positioned in the first position, and at the same time, the movable member 500 can also be kept in the first position. Referring to FIG. 27, the positioning boss 352 is formed by protruding outward from a side face of the convex piece 35, and the size of its bottom is larger than that of its top, such that side faces 3521 of the positioning boss 352 are inclined, which makes the matching between the positioning boss 352 and the second through hole 504 smoother. The shape of the positioning boss 352 on a cross-section parallel to the side face of the convex piece 35 where it is located may be provided to be substantially trapezoid, that is, a top face 3522 of the positioning boss 352 is substantially trapezoid, and its bottom is also substantially trapezoid. The positioning boss 352 is a trapezoid boss. The cross-sectional shape of the corresponding second through hole 504 is matched with the positioning boss 352.

Referring to FIGS. 25 and 26, in order to better position the movable member 500 in the second position, a blocking portion 36 is provided on the main body 3, the blocking portion 36 is located at an end of the convex piece 35 away from the brake 4, and a side face of the blocking portion 36 facing the convex piece 35 is provided as an inclined face. When the movable member 500 is rotated to the second position, an end portion 505 of the movable member 500 away from the brake 4 is in contact with the inclined face of the blocking portion 36, thereby accurately positioning the movable member 500 in the second position. In another implementation, a corner portion 506 may be provided on the movable member 500. When the movable member 500 moves to the second position, the corner portion 506 is in contact with the top of the main body 3 to form a block, thereby accurately positioning the movable member 500 in the second position. Preferably, the end face of the movable member 500 facing the main body 3 is provided with an arc-shaped portion 507. The arc-shaped portion 507 is located below the first through hole 502. The corner portion 506 is provided on a side of the arc-shaped portion 507 away from the brake 4, and the shape of a side close to the brake 4 matches the shape of the main body 3. The arc-shaped portion 507 is always in contact with the top of the main body 3, which is equivalent to that the arc-shaped portion 507 forms a fulcrum. In another implementation, referring to FIG. 28, a top 353 of the convex piece 35 is provided as an inclined face, so that when the movable member 500 is in the first position, there is a gap 354 between the end portion 505 of the movable member 500 away from the brake 4 and the top of the convex piece 35, and when the movable member 500 moves to the second position, the end portion 505 of the movable member 500 away from the brake 4 is in contact with the top of the convex piece 35 to form a block, thereby accurately positioning the movable member 500 in the second position.

Figure 29:
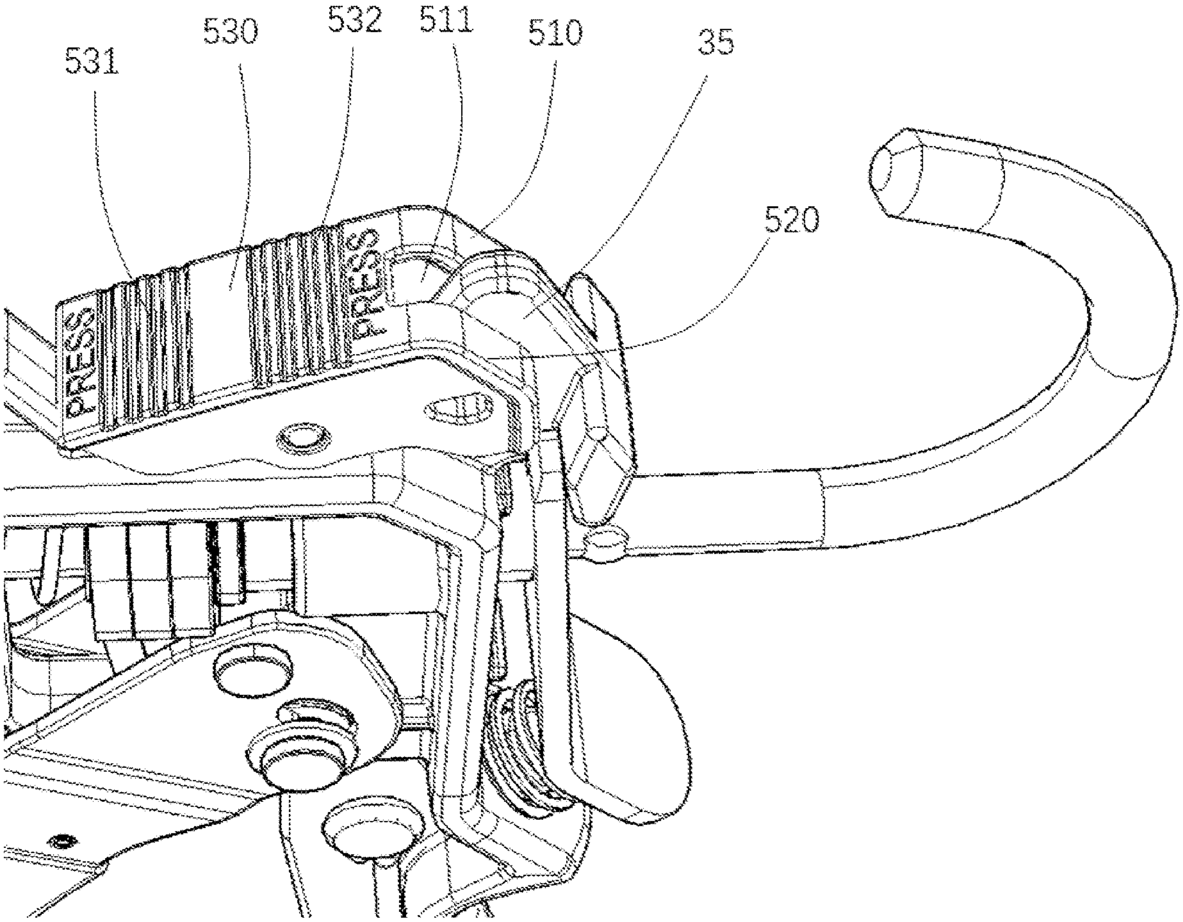
FIG. 29 is a schematic diagram showing the structure of a glue gun according to Embodiment 5 from another perspective.

The movable member 500 may be provided only on one side of the convex piece 35, or may be provided on both opposite sides of the convex piece 35. As shown in FIG. 29, the convex piece 35 is in a shape of a sheet. The movable member 500 includes a first part 510 and a second part 520 that are symmetrical. The shape of the first part 510 and the shape of the second part 520 are exactly the same. That is, the first part 510 is provided with the through hole 502, the second through hole 504, the corner portion 506, the arc-shaped portion 507, etc., and the second part 520 has the same configuration. The first part 510 is located on one side of the convex piece 35, and the second part 520 is located on the other side of the convex piece 35. A gap 511 is formed between the first part 510 and the second part 520 into which the convex piece 35 may be inserted. The first part 510 and the second part 520 are both provided with the first through holes 504, and correspondingly, the pin shafts 351 are provided on both sides of the convex piece 35. The two pin shafts 351 are respectively located in the first through hole 504 of the first part 510 and the first through hole 504 of the second part 520. The first part 510 and the second part 520 are connected together by a connection portion 530, so that the movable member 500 is integrated. In this way, by pressing one end (a proximal end 532) of the connection portion 530 facing the brake 4, the movable member 500 is rotated to the first position; and by pressing one end (a distal end 531) of the connection portion 530 away from the brake 4, the movable member 500 is rotated to the second position.

Embodiment 6

Figure 30:
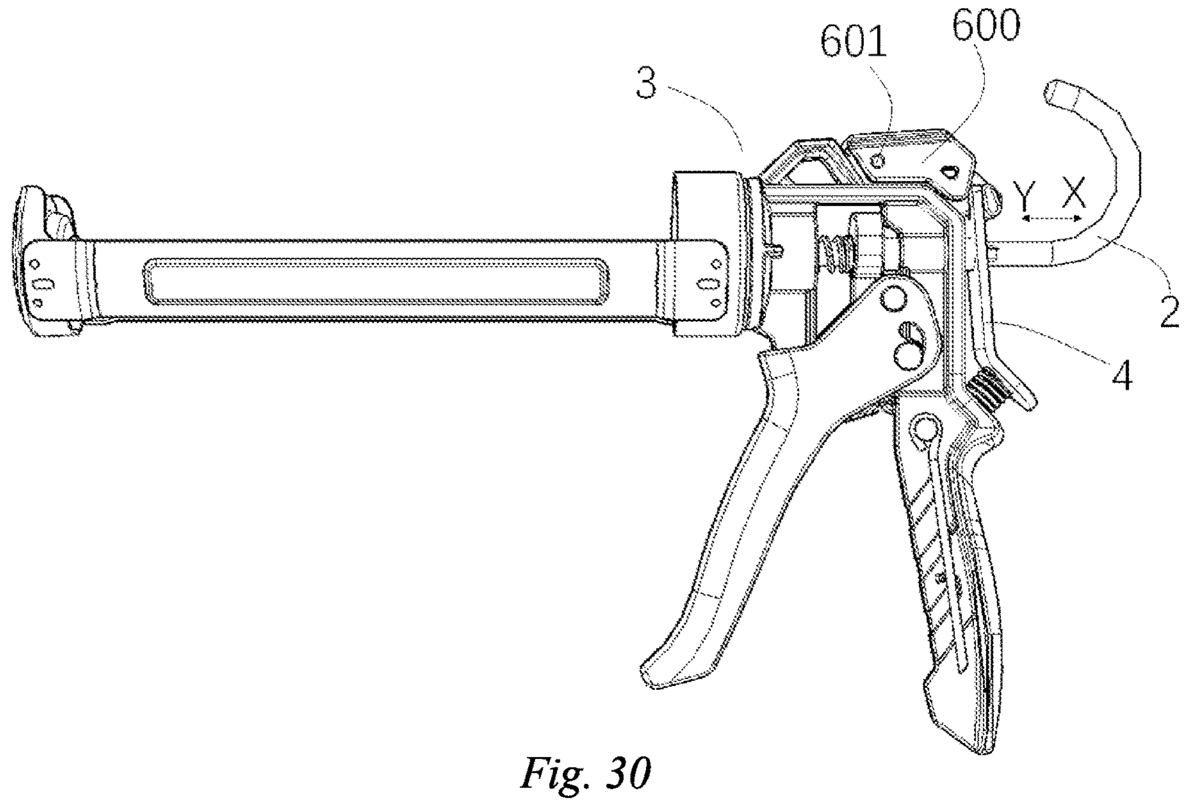
FIG. 30 is a schematic diagram showing the structure of a glue gun in a first state according to Embodiment 6.
Figure 31:
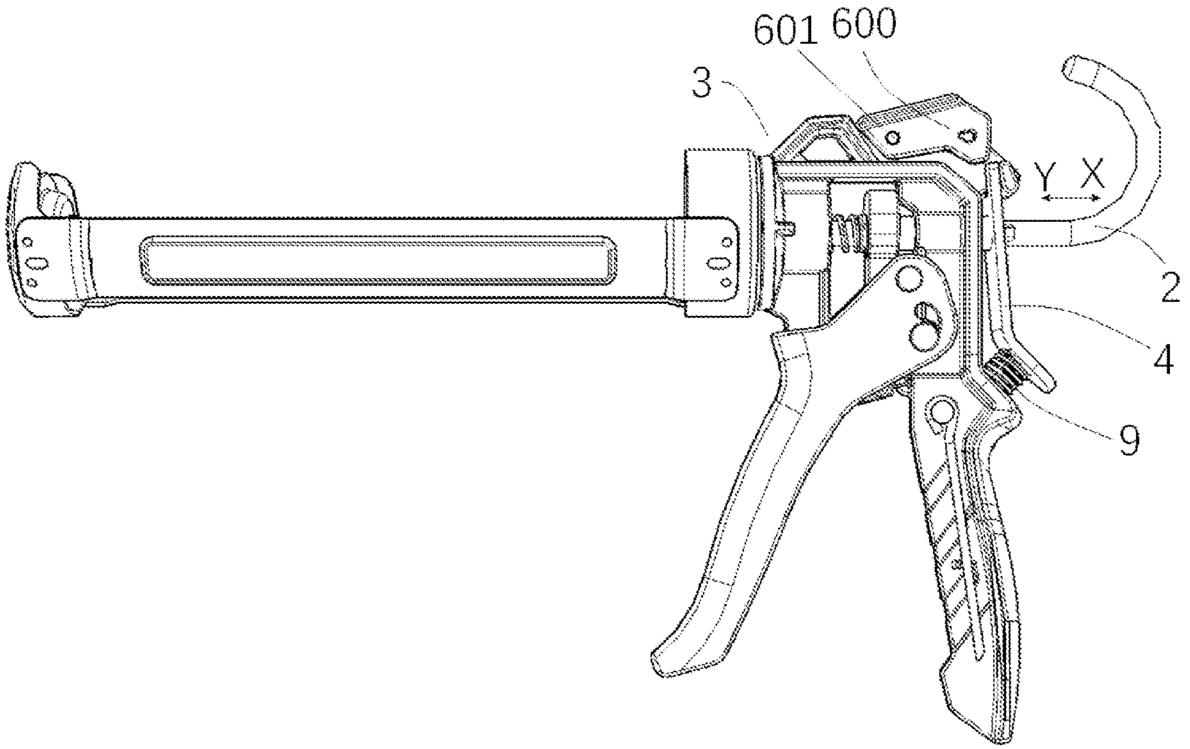
FIG. 31 is a schematic diagram showing the structure of a glue gun in a second state according to Embodiment 6.

As shown in FIGS. 30 and 31, most of the structures in this embodiment are the same as those in Embodiment 5, and the only difference is that, in this embodiment, a rotating shaft 601 (i.e., a pin shaft provided on the convex piece) of a movable member 600 is provided at an end of the movable member away from the brake 4. In this embodiment, when operating the movable member, the movable member 600 can be moved to a first position only by pressing an end opposite to the rotating shaft 601, and the movable member 600 can be moved to a second position by reverse operation.

Embodiment 7

As shown in FIGS. 32 to 37, the difference between this embodiment and Embodiment 5 is that the structure of a movable member 700 is different.

Figure 32:
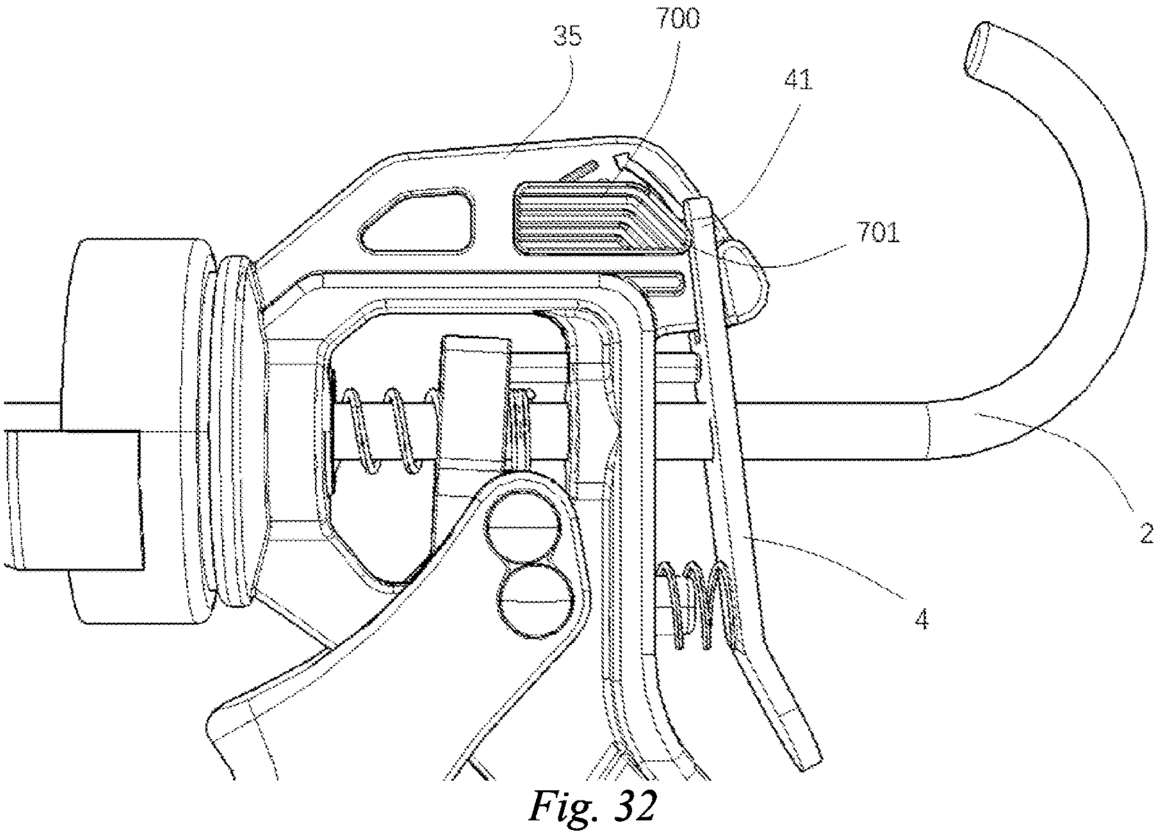
FIG. 32 is a schematic partially-enlarged diagram of a glue gun in a first state according to Embodiment 7.
Figure 33:
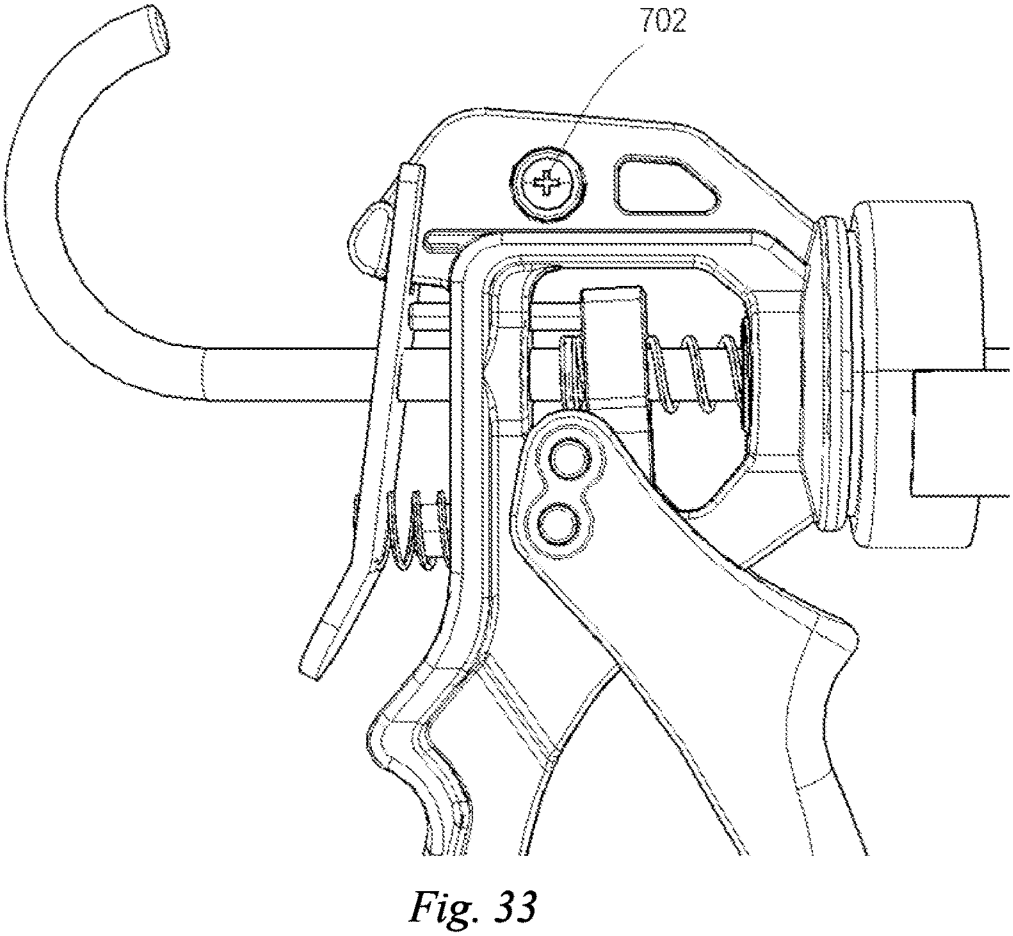
FIG. 33 is a schematic structural diagram of a reverse side of the FIG. 32.
Figure 34:
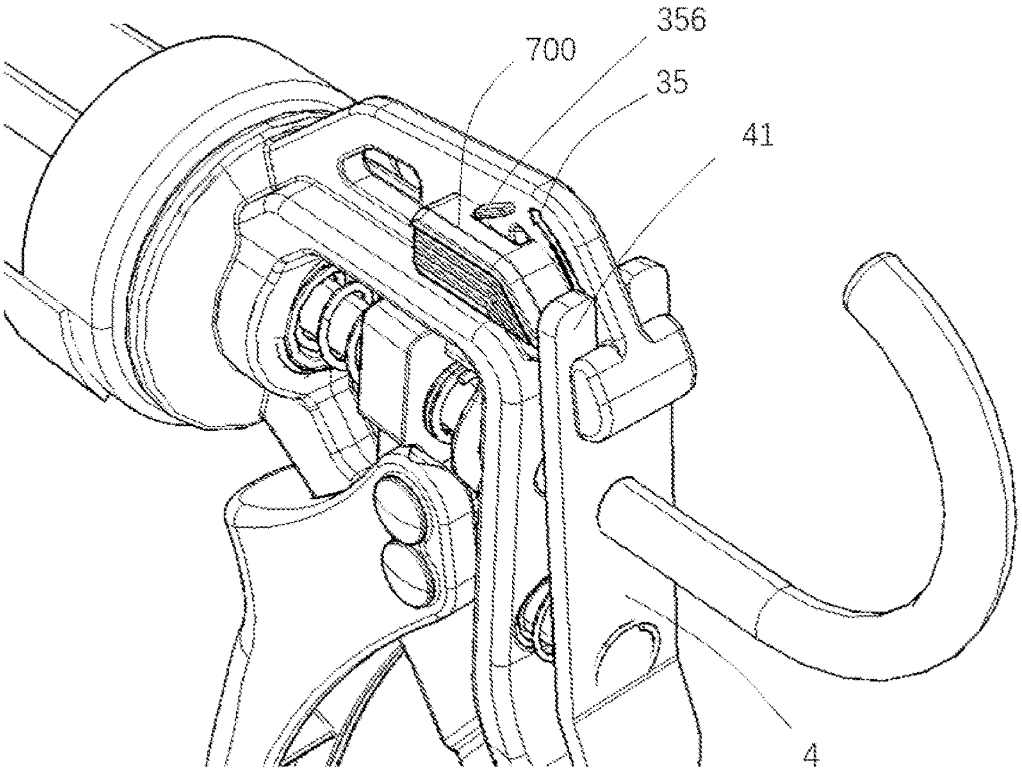
FIG. 34 is a schematic axonometric diagram of FIG. 32.
Figure 35:
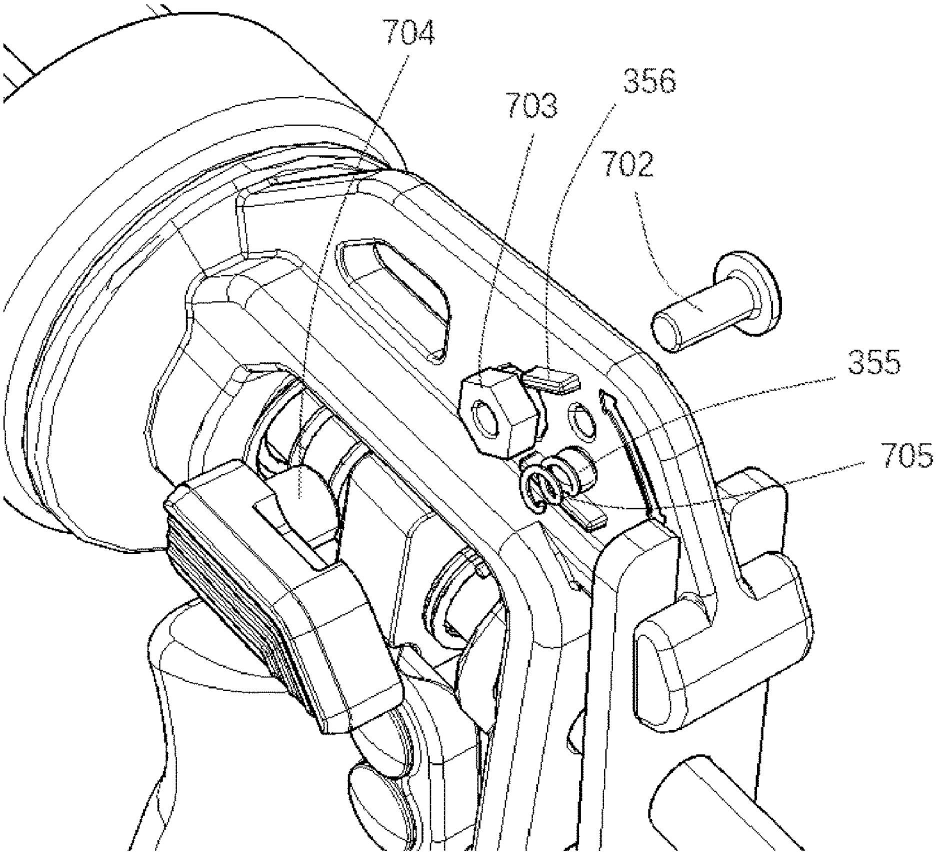
FIG. 35 is a schematic exploded diagram of FIG. 32.
Figure 36:
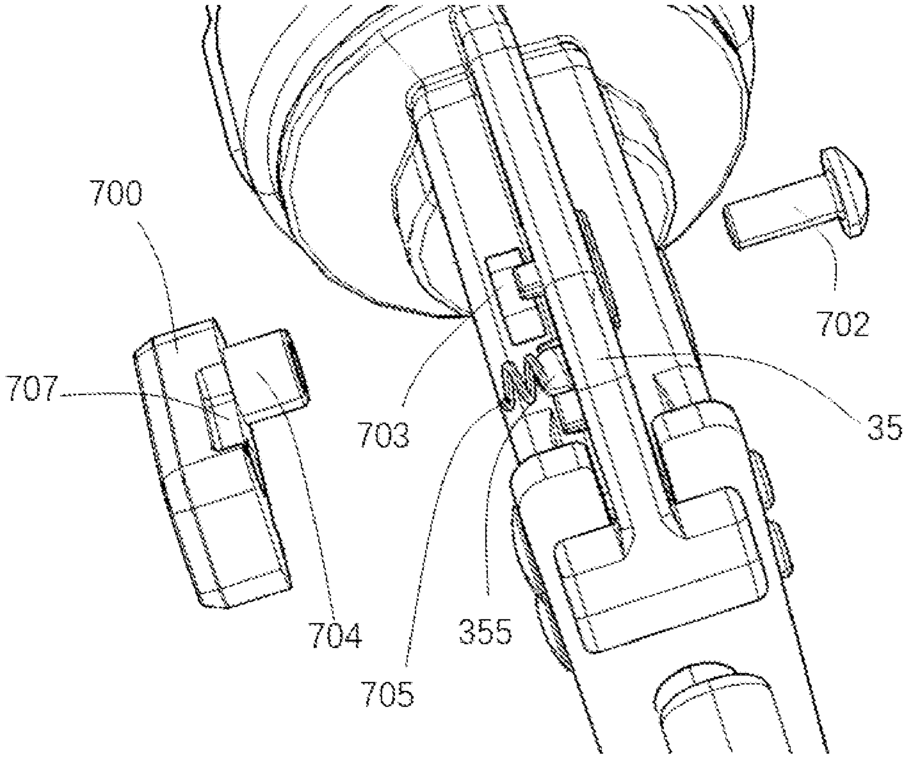
FIG. 36 is a schematic diagram from another perspective of FIG. 35.
Figure 37:
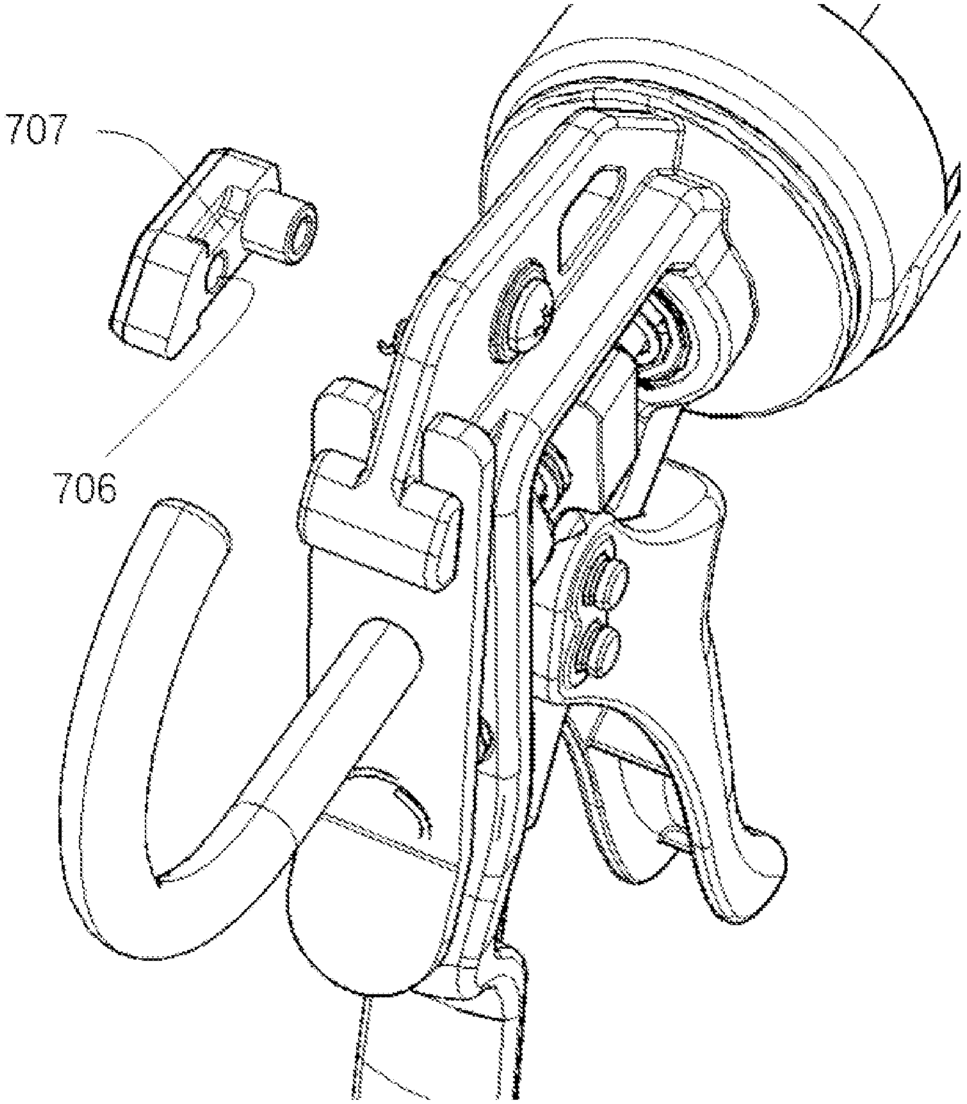
FIG. 37 is a schematic diagram from another perspective of FIG. 35.

Referring to FIG. 32, the movable member 700 is provided on one side of the convex piece 35, and an end of the movable member 700 away from the brake 4 is provided with a rotating shaft. By operating an end portion 701 of the movable member 700 close to the brake 4, the movable member 700 may be rotated. When the movable member 700 is in a first position, the end portion 701 is in contact with the brake 4, thereby locking the brake 4. When the movable member 700 is in a second position, the end portion 701 is away from the brake 4 and no longer blocks the movement of the brake 4.

Referring to FIGS. 34 to 37, the rotating shaft includes a screw 702, and a nut 703 provided at an end of the screw 702. The screw 702 passes through the convex piece 35, and the screw 702 is sheathed with the nut 703. A sleeve 704 is provided on a side of the movable member 700 facing the convex piece 35, and the nut 703 is sheathed with the sleeve 704. When the movable member 700 is rotated, the sleeve 704 rotates around the screw 702 together with the nut 703. Through the cooperation of the screw 702 and the nut 703, the movable member 700 may be kept in a current position.

A blind hole 706 is provided in the side of the movable member 700 facing the convex piece 35. Correspondingly, a protrusion 355 is provided on the convex piece 35. The protrusion 355 is sheathed with a spring 705, and the other end of the spring 705 is inserted into the blind hole 706, so that the spring 705 applies an elastic force on the movable member 700. By pressing the movable member 700 towards the convex piece 35, the movable member 700 can be rotated against the elastic force of the spring 705. After releasing, under the action of the elastic force, the movable member 700 moves away from the convex piece 35, so that the movable member 700 can be locked in the current position.

A groove 707 is provided in an upper portion of the movable member 700, and a blocking portion 356 that can cooperate with the groove 707 is provided on the convex piece 35. The blocking portion 356 is provided obliquely. When the movable member 700 is rotated to the second position, the blocking portion 356 falls into the groove 707, which can form a block for the movable member 700, so that the movable member 700 can be accurately positioned in the second position.

The preferred specific embodiments of the present invention have been described in detail above. It should be understood that a person of ordinary skill in the art would be able to make various modifications and variations according to the concept of the present invention without involving any inventive effort. Therefore, any technical solution that can be obtained by a person skilled in the art by means of logical analysis, reasoning or limited trials on the basis of the prior art and according to the concept of the present invention should fall within the scope of protection defined by the claims.

The invention claimed is:

1. A glue gun, comprising:

a main body with one end formed as an accommodation part for accommodating a glue cylinder;

a fixed handle connected to another end of the main body;

a movable handle pivotally connected to the fixed handle;

a push rod with one end located in the accommodation part;

a brake provided on the push rod; and a movable member provided on the main body, wherein the movable member is configured to lock the brake, so as to continuously apply a force on glue in the glue cylinder to keep an internal stress of the glue, and release the brake to release the force applied on the glue in the glue cylinder, thereby releasing the internal stress of the glue;

wherein a top of the main body is provided with a convex piece, and the movable member is pivotally connected to the convex piece;

wherein the convex piece is provided with a pin shaft, a first through hole is provided in the movable member, and the pin shaft is sheathed in the first through hole.

2. The glue gun of claim 1, wherein the convex piece is provided with a limiting groove, the limiting groove has a first limiting end and a second limiting end, one end of the brake is located in the limiting groove, and the brake is configured to move between the first limiting end and the second limiting end.

3. The glue gun of claim 2, wherein the movable member is configured to be movable; and the movable member has a first position and a second position, wherein in the first position, the movable member locks the brake, so after the movable handle is released, the internal stress of the glue is still kept, so that the glue in the glue cylinder is dripping continuously; and in the second position, the movable member unlocks the brake, so after the movable handle is released, the internal stress of the glue is released, so that the glue does not drip any more.

4. The glue gun of claim 3, wherein the movable member has an end portion facing the brake; when the movable member is in the first position, the end portion locks the brake; and when the movable member is in the second position, the end portion releases the brake.

5. The glue gun of claim 3, wherein the first through hole is located in a middle of the movable member.

6. The glue gun of claim 5, wherein a second through hole is provided in the movable member, a positioning boss is provided on the convex piece, and when the movable member is in the first position, a part of the positioning boss is embedded into the second through hole.

7. The glue gun of claim 6, wherein the positioning boss is a trapezoid boss, side faces of the trapezoid boss are inclined, and a size of a top of the trapezoid boss is smaller than a size of a bottom of the trapezoid boss.

8. The glue gun of claim 5, wherein the movable member is provided with a corner portion, the corner portion faces the main body, and when the movable member is in the second position, the corner portion is in contact with the main body to block the movable member.

9. The glue gun of claim 8, wherein the movable member is provided with an arc-shaped portion, the arc-shaped portion and the corner portion are located on a same side of the movable member, and the arc-shaped portion is always in contact with the main body.

10. The glue gun of claim 5, wherein the movable member comprises a first part and a second part that are the same in shape and are symmetrically arranged, there is a gap between the first part and the second part, and the convex piece is inserted into the gap; and the first part and the second part are connected together by a connection portion.

11. The glue gun of claim 10, wherein the connection portion is provided with a proximal end and a distal end, and the movable member is configured such that when the proximal end is pressed, the movable member is rotated to the first position, and when the distal end is pressed, the movable member is rotated to the second position.

12. The glue gun of claim 3, wherein a rotating shaft of the movable member is provided at an end away from the brake.

13. The glue gun of claim 12, wherein the movable member is configured such that when an end of the movable member opposite to the rotating shaft is pressed, the movable member is moved to the first position.

14. A glue gun, comprising:

a main body with one end formed as an accommodation part for accommodating a glue cylinder;

a fixed handle connected to another end of the main body:

a movable handle pivotally connected to the fixed handle;

a push rod with one end located in the accommodation part;

a brake provided on the push rod; and a movable member provided on the main body, wherein the movable member is configured to lock the brake, so as to continuously apply a force on glue in the glue cylinder to keep an internal stress of the glue, and release the brake to release the force applied on the glue in the glue cylinder, thereby releasing the internal stress of the glue;

wherein a top of the main body is provided with a convex piece, and the movable member is pivotally connected to the convex piece;

wherein the movable member is provided on one side of the convex piece, and a rotating shaft of the movable member is provided at an end of the movable member away from the brake;

wherein the rotating shaft of the movable member comprises a screw passing through the convex piece and a nut provided at one end of the screw, and the movable member is provided with a sleeve with which the nut is sheathed.

15. The glue gun of claim 14, wherein a blind hole is provided in the movable member, the blind hole and the sleeve are provided on a same side of the movable member, the convex piece is provided with a protrusion, and an elastic element connects the protrusion and the blind hole respectively.

16. The glue gun of claim 14, wherein the convex piece is provided with a limiting groove, the limiting groove has a first limiting end and a second limiting end, one end of the brake is located in the limiting groove, and the brake is configured to move between the first limiting end and the second limiting end.

17. The glue gun of claim 16, wherein the movable member is configured to be movable; and the movable member has a first position and a second position, wherein in the first position, the movable member locks the brake, so after the movable handle is released, the internal stress of the glue is still kept, so that the glue in the glue cylinder is dripping continuously; and in the second position, the movable member unlocks the brake, so after the movable handle is released, the internal stress of the glue is released, so that the glue does not drip any more.

18. The glue gun of claim 17, wherein a groove is provided in the movable member, a blocking portion is protruded on the convex piece, and the blocking portion falls into the groove when the movable member is in the second position.

19. The glue gun of claim 18, wherein the blocking portion is obliquely provided on the convex piece.

20. The glue gun of claim 17, wherein the movable member has an end portion facing the brake; when the movable member is in the first position, the end portion locks the brake; and when the movable member is in the second position, the end portion releases the brake.

* * * * *